US009835349B2

(12) United States Patent
Salsbury et al.

(10) Patent No.: US 9,835,349 B2
(45) Date of Patent: Dec. 5, 2017

(54) EXTREMUM-SEEKING CONTROL FOR AIRSIDE ECONOMIZERS

(71) Applicant: Johnson Controls Technology Company, Holland, MI (US)

(72) Inventors: Timothy I. Salsbury, Whitefish Bay, WI (US); John M. House, Montreal (CA)

(73) Assignee: Johnson Controls Technology Company, Milwaukee, WI (US)

( * ) Notice: Subject to any disclaimer, the term of this patent is extended or adjusted under 35 U.S.C. 154(b) by 567 days.

(21) Appl. No.: 14/495,773

(22) Filed: Sep. 24, 2014

(65) Prior Publication Data

US 2016/0084514 A1    Mar. 24, 2016

(51) Int. Cl.
| | |
|---|---|
| G05B 21/00 | (2006.01) |
| G05B 13/00 | (2006.01) |
| G05B 15/00 | (2006.01) |
| G05D 23/00 | (2006.01) |
| G01M 1/38 | (2006.01) |
| F24F 11/00 | (2006.01) |
| F24F 3/044 | (2006.01) |

(52) U.S. Cl.
CPC ............ F24F 11/006 (2013.01); F24F 3/044 (2013.01); Y02B 30/767 (2013.01)

(58) Field of Classification Search
CPC .............................. F24F 11/006; G05B 15/02
USPC ............................................. 700/78, 33, 30
See application file for complete search history.

(56) References Cited

U.S. PATENT DOCUMENTS

| | | | | |
|---|---|---|---|---|
| 5,564,626 | A | * | 10/1996 | Kettler .................... F24F 3/044 236/49.3 |
| 7,827,813 | B2 | | 11/2010 | Seem |
| 8,027,742 | B2 | | 9/2011 | Seem et al. |
| 8,200,344 | B2 | | 6/2012 | Li et al. |
| 8,200,345 | B2 | | 6/2012 | Li et al. |
| 8,473,080 | B2 | | 6/2013 | Seem et al. |
| 2008/0179409 | A1 | * | 7/2008 | Seem ................... F24F 11/0001 236/49.3 |

(Continued)

OTHER PUBLICATIONS

A. Horch, "A simple method for detection of stiction in control valves," Control Engineering Practice, vol. 7, pp. 1221-1231, 1999.

(Continued)

*Primary Examiner* — Mohammad Ali
*Assistant Examiner* — Md Azad
(74) *Attorney, Agent, or Firm* — Foley & Lardner LLP

(57) ABSTRACT

A method for controlling an economizer in a building HVAC system includes providing a manipulated variable as an input to a control process, holding the manipulated variable at a first extremum during a first portion of an evaluation period, and applying a dither signal to the manipulated variable during a second portion of the evaluation period. The dither signal causes the manipulated variable to deviate from the extremum. The method further includes monitoring a variable of interest output by the control process during the first and second portions of the evaluation period and switching the manipulated variable to a second extremum opposite the first extremum in response to the variable of interest moving toward an optimal value during the second portion of the evaluation period.

17 Claims, 7 Drawing Sheets

(56) References Cited

U.S. PATENT DOCUMENTS

| | | | | |
|---|---|---|---|---|
| 2010/0106331 A1* | 4/2010 | Li | .......................... | F24F 11/006 700/277 |
| 2011/0082594 A1* | 4/2011 | Dage | .................. | B60H 1/00985 700/278 |
| 2014/0330438 A1* | 11/2014 | Haines | ................... | G05B 15/02 700/276 |

OTHER PUBLICATIONS

A. Horch, et al., "A modified index for control performance assessment". Proceedings of the American Control Conference, Jun. 1998, 5 pages.

A. Horch. "Condition Monitoring of Control Loops". Ph.D. dissertation, Royal Institute of Technology, Stockholm, Sweden. 2000, 216 pages.

A. O'Dwyer, Handbook of PI and PID Controller Tuning Rules. London: Imperial College Press, 2009, 623 pages.

A. Ordys, et al., Process Control Performance Assessment: From Theory to Implementation. Springer, 2007.

B. Kedem, Time Series Analysis by Higher Order Crossings. New York: IEEE Press, 1994, 48 pages.

B.-S. Ko et al., "Pid control performance assessment: The single-loop case," A/CHE Journal, vol. 50, No. 6, pp. 1211-1218, Jun. 2004.

J. A. McFadden, "The axis-crossing interval of random functions," IRE Transactions on Information Theory, vol. IT-2, pp. 146-150, 1956, 11 pages.

L. Desborough et al., "Performance assessment measures for univariate feedback control," The Canadian Journal of Chemical Engineering, vol. 70, p. 1186, 1992.

Li, et al., "Dynamic Modeling and Self-Optimizing Control of Air-Side Economizers." Proceedings of the 6th International Modelica Conference. pp. 447-464. Bielefeld, Germany. Mar. 3-4, 2008, 18 pages.

Mohieddine Jelali, "An overview of control performance assessment technology and industrial applications." Control Eng. Practice, vol. 14, No. 5, p. 441, 2006.

Seem, et al., "Development and Evaluation of Optimization-based Air Economizer Strategies." Applied Energy. 2010, 87(3): pp. 910-924.

T.J. Harris, "Assessment of Control Loop Performance". Canadian Journal of Chemical Engineering. vol. 67, pp. 856. 1989.

Taylor, S. T. and Cheng, C.H. 2010. "Economizer High Limit Controls and Why Enthalpy Economizers Don't Work." ASHRAE Journal. vol. 52, No. 11, 11 pages.

* cited by examiner

| City | Climate | Annual coil load (kJ/kg) | | | |
|---|---|---|---|---|---|
| | | Fixed Dry-Bulb Temperature Control | Differential Enthalpy Control | Model-based Control | Simple ESC |
| Miami | Very hot-humid | 147,976 | 146,152 | 146,125 | 146,347 |
| Houston | Hot-humid | 107,848 | 106,328 | 106,300 | 106,599 |
| Charlotte | Warm-humid | 71,075 | 69,019 | 68,957 | 69,189 |
| New York | Mixed-humid | 52,811 | 50,925 | 50,886 | 51,058 |
| Chicago | Cool-humid | 45,110 | 43,329 | 43,257 | 43,502 |
| Minneapolis | Cold-humid | 38,190 | 36,721 | 36,687 | 36,882 |
| Rhinelander | Very cold-humid | 32,689 | 31,442 | 31,327 | 31,563 |
| Phoenix | Hot-dry | 88,366 | 88,283 | 86,537 | 88,467 |
| Los Angeles | Warm-dry | 55,060 | 54,822 | 54,691 | 54,857 |
| Albuquerque | Mixed-dry | 41,649 | 40,527 | 39,847 | 40,912 |
| Denver | Cool-dry | 32,188 | 31,695 | 30,909 | 31,987 |
| Cheyenne | Cold-dry | 18,292 | 18,300 | 17,873 | 18,409 |
| Jackson | Very cold-dry | 11,674 | 11,108 | 10,871 | 11,125 |
| San Francisco | Warm-marine | 18,673 | 18,546 | 18,520 | 18,565 |
| Seattle | Mixed-marine | 16,771 | 16,078 | 16,071 | 16,128 |

FIG. 5

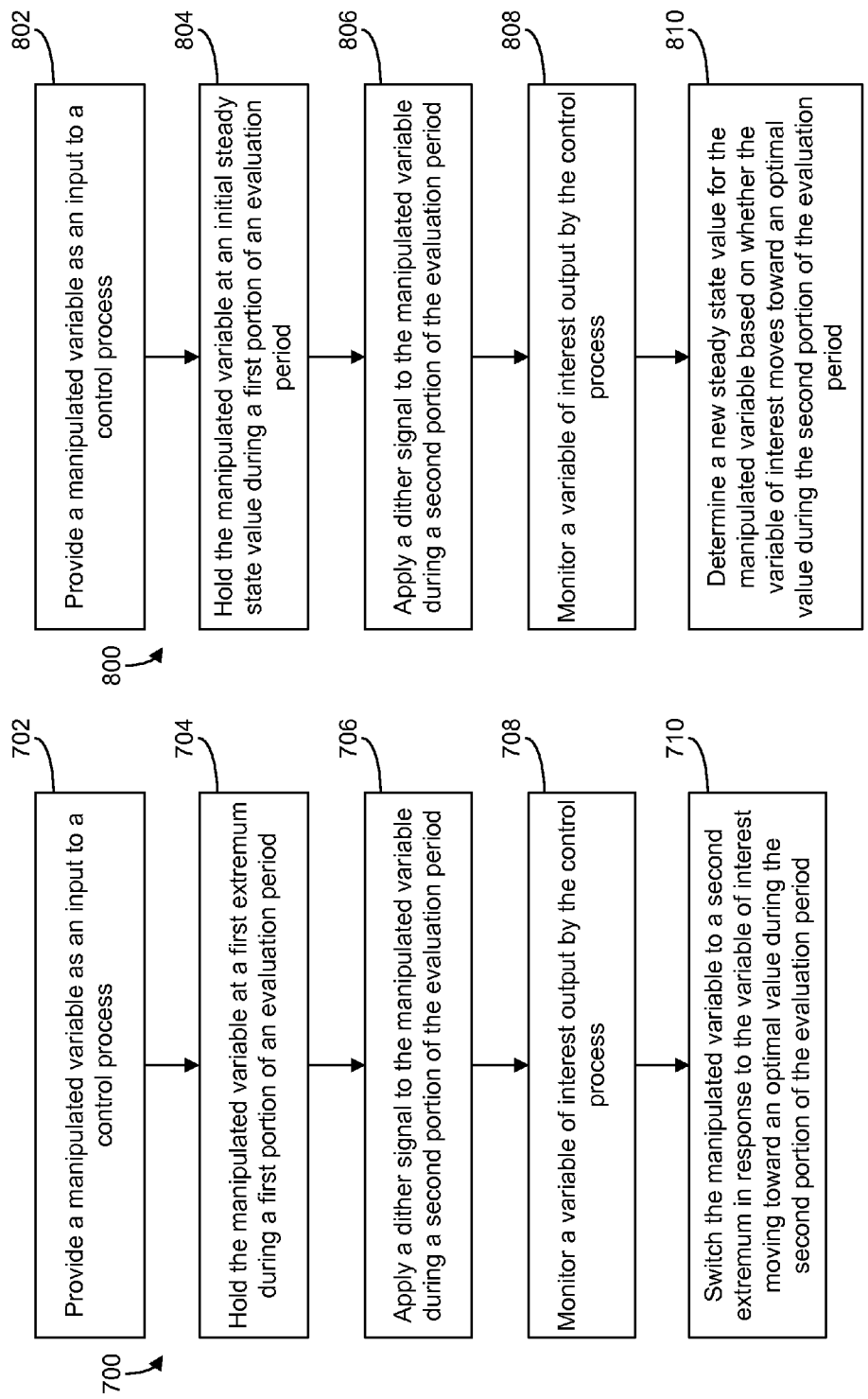

EXTREMUM-SEEKING CONTROL FOR AIRSIDE ECONOMIZERS

BACKGROUND

The present description relates generally to extremum seeking control strategies. The present description relates more particularly to regulating, via extremum seeking control, the amount of air that is flowing through a heating, ventilation and air conditioning (HVAC) system in order to reduce the amount of mechanical heating or cooling required within an air-handling unit (AHU).

Air-side economizers are used in AHUs to control the amount of air that is recirculated from within a building. The objective of economizer control logic is to control the mixing box dampers to achieve the right mixture of outside air and recirculated air in order to minimize the amount of energy consumed to heat or cool the building. Some AHU controllers use model-based control strategies that rely on a model of the system (e.g., a cooling coil model) as well as accurate measures of humidity and temperature for both the outdoor and return airstreams.

Extremum seeking control (ESC) is a class of self-optimizing control strategies that can dynamically search for the unknown and/or time-varying inputs of a system for optimizing a certain performance index. It can be considered a dynamic realization of gradient searching through the use of dither signals. The gradient of the system output with respect to the system input is typically obtained by slightly perturbing the system operation and applying a demodulation measure. Optimization of system performance can be obtained by driving the gradient towards zero by using an integrator in the closed-loop system. ESC is a non-model based control strategy, meaning that a model for the controlled system is not necessary for ESC to optimize the system. However, the algorithms used to implement an ESC strategy are often relatively complex.

SUMMARY

One implementation of the present disclosure is a method for controlling an economizer in a building HVAC system. The method includes providing a manipulated variable as an input to a control process, holding the manipulated variable at a first extremum during a first portion of an evaluation period, and applying a dither signal to the manipulated variable during a second portion of the evaluation period. The dither signal causes the manipulated variable to deviate from the extremum. The method further includes monitoring a variable of interest output by the control process during the first and second portions of the evaluation period and switching the manipulated variable to a second extremum opposite the first extremum in response to the variable of interest moving toward an optimal value during the second portion of the evaluation period. One or more of the method steps may be performed by a processing circuit of a controller.

In some embodiments, the first extremum is one of a maximum or a minimum of a range of values at which the manipulated variable can be provided to the control process and the second extremum is the other of the maximum or the minimum.

In some embodiments, the method includes returning the manipulated variable to the first extremum in response to the variable of interest moving away from the optimal value during the second portion of the evaluation period.

In some embodiments, applying the dither signal to the manipulated variable includes determining an amplitude of the dither signal and adjusting the manipulated variable toward the second extremum by an amount corresponding to the amplitude of the dither signal.

In some embodiments, the method includes calculating a first value for the variable of interest using one or more values of the variable of interest observed during the first portion of the evaluation period, calculating a second value for the variable of interest using one or more values of the variable of interest observed during the second portion of the evaluation period, and comparing the first and second calculated values to determine whether the variable of interest moves toward the optimal value.

In some embodiments, comparing the first and second calculated values includes using the first calculated value for the variable of interest to compute at least one of an upper threshold and a lower threshold and determining that the variable of interest moves toward the optimal value in response to a determination that the second calculated value for the variable of interest is greater than the upper threshold or less than the lower threshold.

In some embodiments, comparing the first and second calculated values includes computing a difference between the first and second calculated values and determining that the variable of interest moves toward the optimal value in response to a determination that the difference between the first and second calculated values exceeds a threshold.

In some embodiments, the first calculated value is an average of a plurality of observed values of the variable of interest observed during the first portion of the evaluation period and the second calculated value is an average of a plurality of observed values of the variable of interest observed during the second portion of the evaluation period.

In some embodiments, the method includes removing the dither signal from the manipulated variable before an end of the second portion of the evaluation period in response to a determination that the variable of interest moves toward or away from the optimal value by an amount exceeding a threshold and applying the dither signal to the manipulated variable for an entire duration of the second portion of the evaluation period in response to a determination that the variable of interest does not move toward or away from the optimal value by the amount exceeding the threshold.

In some embodiments, the method includes using the variable of interest to calculate a normalized value for the manipulated variable, converting the normalized value for the manipulated variable into a control signal adapted for the control process, and providing the control signal as an input to the control process.

Another implementation of the present disclosure is a method for controlling an economizer in a building HVAC system. The method includes providing a manipulated variable as an input to a control process, holding the manipulated variable at an initial steady state value during a first portion of an evaluation period, and applying a dither signal to the manipulated variable during a second portion of the evaluation period. The dither signal causes the manipulated variable to deviate in a first direction from the initial steady state value. The method further includes monitoring a variable of interest output by the control process during the first and second portions of the evaluation period and adjusting the manipulated variable in the first direction to a new steady state value in response to the variable of interest moving toward an optimal value during the second portion of the evaluation period. One or more method steps may be performed by a processing circuit of a controller.

In some embodiments, the method includes identifying a plurality of discrete values at which the manipulated variable can be provided to the control process. Holding the manipulated variable at the initial steady state value may include holding the manipulated variable at one of a plurality of identified discrete values.

In some embodiments, the initial steady state value is a first extremum of the manipulated variable and the new steady state value is a second extremum of the manipulated variable, opposite the first extremum. In other embodiments, at least one of the initial steady state value and the new steady state value is an intermediate value between two extremums of the manipulated variable.

In some embodiments, the method includes returning the manipulated variable to the initial steady state value in response to the variable of interest not moving toward the optimal value during the second portion of the evaluation period.

In some embodiments, the method includes adjusting the manipulated variable in a second direction opposite the first direction in response to the variable of interest moving away from the optimal value during the second portion of the evaluation period.

In some embodiments, the method includes calculating a first value for the variable of interest using one or more values of the variable of interest observed during the first portion of the evaluation period, calculating a second value for the variable of interest using one or more values of the variable of interest observed during the second portion of the evaluation period, and comparing the first and second calculated values to determine whether the variable of interest moves toward the optimal value.

Another implementation of the present disclosure is an economizer controller in a building HVAC system. The controller includes a communications interface configured to provide a manipulated variable as an input to a control process and a processing circuit having a processor and memory. The processing circuit is configured to hold the manipulated variable at an initial steady state value during a first portion of an evaluation period and apply a dither signal to the manipulated variable during a second portion of the evaluation period. The dither signal causes the manipulated variable to deviate in a first direction from the initial steady state value. The processing circuit is configured to monitor a variable of interest output by the control process during the first and second portions of the evaluation period and adjust the manipulated variable in the first direction to a new steady state value in response to the variable of interest moving toward an optimal value during the second portion of the evaluation period.

In some embodiments, the initial steady state value is a first extremum of the manipulated variable and the new steady state value is a second extremum of the manipulated variable, opposite the first extremum.

In some embodiments, the processing circuit is configured to return the manipulated variable to the initial steady state value in response to the variable of interest not moving toward the optimal value during the second portion of the evaluation period.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 5 is a table of energy performance results for several different types of control strategies including the ESC strategy performed by the controller of FIG. 3, according to an exemplary embodiment.

FIG. 7 is a flowchart of another process that may be performed by the controller of FIG. 3 for controlling an economizer in a building HVAC system, according to an exemplary embodiment.

FIG. 8 is a flowchart of yet another process that may be performed by the controller of FIG. 3 for controlling an economizer in a building HVAC system, according to an exemplary embodiment.

DETAILED DESCRIPTION

Figure 1:
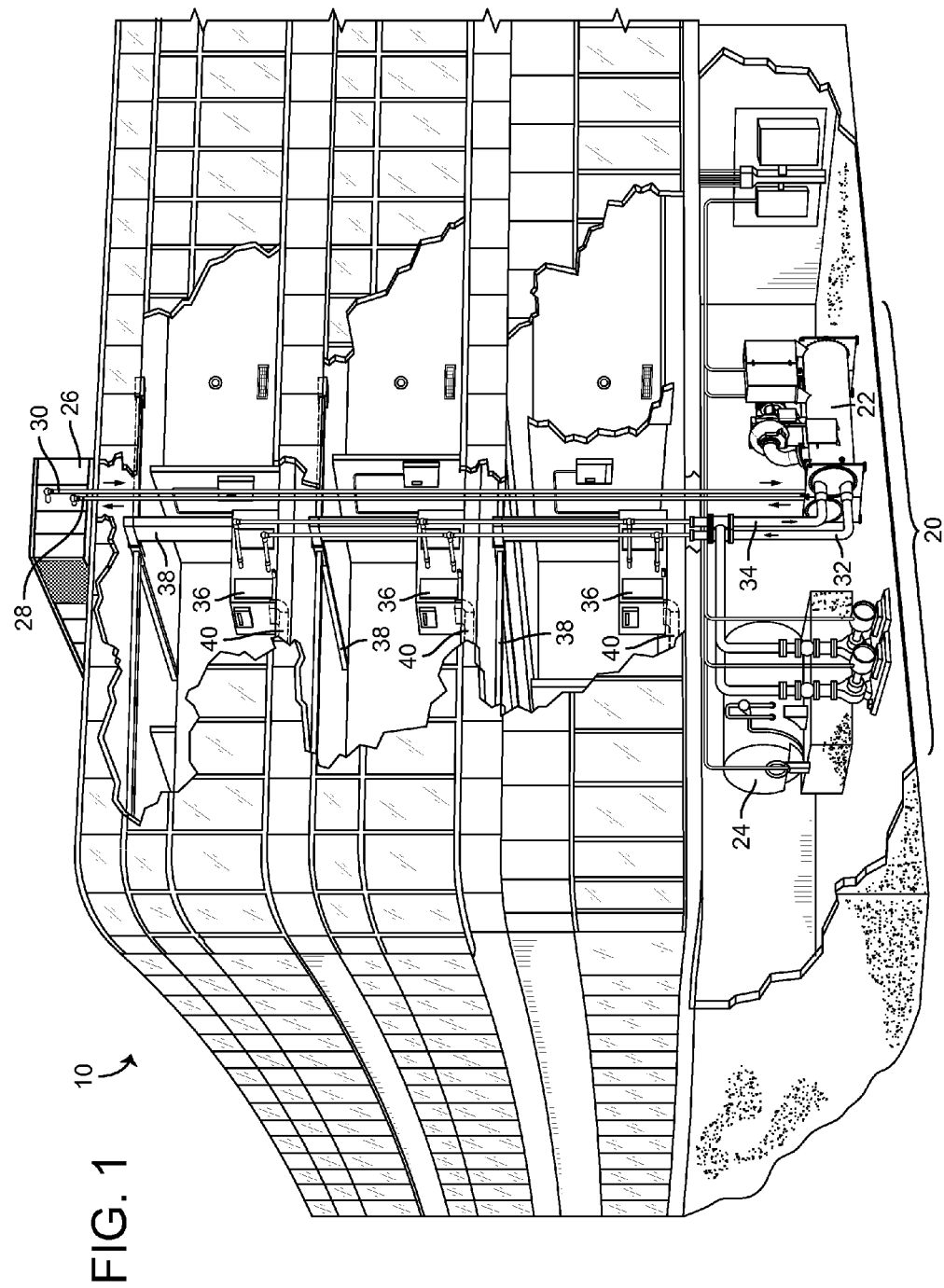
FIG. 1 is a drawing of a building 10 serviced by a heating, ventilation, and air conditioning system (HVAC) system, according to an exemplary embodiment.

Referring generally to the FIGURES, systems and methods for implementing an extremum-seeking control (ESC) strategy in airside economizers are shown, according to various exemplary embodiments. The systems and methods described herein may be used to reduce the amount of energy consumed by an air-handling unit (AHU) of a building heating, ventilation, and air conditioning (HVAC) system by facilitating efficient economizer operation.

ESC is a class of self-optimizing control that can dynamically search for the unknown and/or time-varying inputs to a process that optimize a performance index for the process. ESC can be implemented using gradient searching through the use of dithering signals (e.g., sinusoidal, square-wave, etc.). That is, the gradient of the process output with respect to the process input can be obtained by perturbing (e.g., varying in a controlled manner, oscillating, etc.) the process input and applying a corresponding demodulation on the observed changes in the process output. Improvement or optimization of system performance is sought by driving the gradient toward zero. ESC is typically considered a non-model based control strategy because a model for the controlled process is not necessary to optimize the system. Various implementations of ESC are described in detail in U.S. Pat. No. 8,473,080, U.S. Pat. No. 7,827,813, U.S. Pat. No. 8,027,742, U.S. Pat. No. 8,200,345, and U.S. Pat. No. 8,200,344, each of which is incorporated by reference herein.

The idea underlying ESC is very intuitive; the variable for which an optimum value is sought (i.e., the manipulated variable) is varied about its current value and its effect measured. The manipulated variable is then moved in the direction that leads to a more favorable outcome and the procedure is repeated until the manipulated variable arrives at its optimal point. ESC can be implemented in an airside economizer (e.g., within an AHU) to minimize the load on a heat exchanger. For example, the amount of recirculation can be varied and its effect measured on a valve regulating the flow of fluid through the heat exchanger. Using the valve position directly in this way avoids the need for any sensors (e.g., temperature sensors, humidity sensors, etc.) and eliminates the need for a model of the heat exchanger or knowledge of its heat transfer properties.

Traditional uses of ESC in economizers have been unnecessarily complex. ESC is well-suited for finding an optimal point in a continuous variable. However, the optimal solution for an airside economizer often lies at one of the extreme values of the damper position variable (i.e., a variable representing the position of the outside air or recirculation air damper).

The invention described herein is a result of the realization that airside economizer optimization can be simplified to an optimization problem with a finite number (e.g., two, three, four, etc.) of discrete solutions corresponding to various damper positions. In the simplest embodiment, the optimization problem can be stated as two-position optimization where the optimal damper position is either a first extreme position (e.g., completely open, 100% outside airflow into the building, etc.) or a second extreme position (e.g., completely closed, a damper position that provides for a minimum amount of outside airflow into the building based on minimum ventilation requirements, etc.). In other embodiments, the optimal damper position may be selected from a set of damper positions including the first extreme position, the second extreme position, and one or more intermediate damper positions. Advantageously, the discrete optimization problem does not require all the gradient extraction capability inherent in traditional ESC. The ESC concept of moving in the direction of the optimum based on measuring the variable of interest directly is used in a much simpler framework that is more suited to implementation in HVAC control strategies.

In one embodiment of the present invention, an AHU controller uses a dither signal to excite a variable for which an optimal value is sought (e.g., damper position). For example, the AHU controller may hold the damper at one of the extreme positions and then provide a small excursion away from the extreme for a limited period. In some instances, the AHU controller initially positions the damper to provide 100% outside air and holds this state until a small excursion is made that moves the damper to recirculate some (e.g., 15%) of the return air for a limited period. In other instances, the AHU controller initially positions the damper to provide a minimum amount of outside air (e.g., based on ventilation requirements) and holds this state until a small excursion is made that moves the damper to provide more outside air for a limited period.

The effect of the excursion may be measured by monitoring a variable of interest (e.g., cooling valve position, energy consumption, etc.) and used to adjust the damper position. If the variable of interest moves toward an optimal or target value (by an amount exceeding a threshold) as a result of the excursion, the position of the damper may be adjusted in the direction of the excursion (e.g., moved into the other extreme position or an intermediate position in the direction of the excursion). If the variable of interest moves away from the optimal or target value (by an amount exceeding a threshold) as a result of the excursion, the position of the damper may be maintained at its original position or adjusted in a direction opposite the direction of the excursion (e.g., held in the same extreme position or moved from one intermediate position to another intermediate position or extreme position in the direction opposite the excursion).

Although the systems and methods of the present disclosure are described in the context of airside economizers in a HVAC system, it is understood that the invention can be readily implemented in various types of controllers (e.g., motor controllers, power controllers, fluid controllers, other types of HVAC controllers, lighting controllers, chemical controllers, process controllers, etc.). The invention is not limited to the details or methodology set forth in the description or illustrated in the figures. It is also understood that the terminology is for the purpose of description only and should not be regarded as limiting.

Referring now to FIG. 1, a perspective view of a building 10 is shown. Building 10 is serviced by a heating, ventilation, and air conditioning system (HVAC) system 20. HVAC system 20 is shown to include a chiller 22, a boiler 24, a rooftop cooling unit 26, and a plurality of air-handling units (AHUs) 36. HVAC system 20 uses a fluid circulation system to provide heating and/or cooling for building 10. The circulated fluid may be cooled in chiller 22 or heated in boiler 24, depending on whether cooling or heating is required. Boiler 24 may add heat to the circulated fluid by burning a combustible material (e.g., natural gas). Chiller 22 may place the circulated fluid in a heat exchange relationship with another fluid (e.g., a refrigerant) in a heat exchanger (e.g., an evaporator). The refrigerant removes heat from the circulated fluid during an evaporation process, thereby cooling the circulated fluid.

The circulated fluid from chiller 22 or boiler 24 may be transported to AHUs 36 via piping 32. AHUs 36 may place the circulated fluid in a heat exchange relationship with an airflow passing through AHUs 36. For example, the airflow may be passed over piping in fan coil units or other air conditioning terminal units through which the circulated fluid flows. AHUs 36 may transfer heat between the airflow and the circulated fluid to provide heating or cooling for the airflow. The heated or cooled air may be delivered to building 10 via an air distribution system including air supply ducts 38 and may return to AHUs 36 via air return ducts 40. HVAC system 20 is shown to include a separate AHU 36 on each floor of building 10. In other embodiments, a single AHU (e.g., a rooftop AHU) may supply air for multiple floors or zones. The circulated fluid from AHUs 36 may return to chiller 22 or boiler 24 via piping 34.

In some embodiments, the refrigerant in chiller 22 is vaporized upon absorbing heat from the circulated fluid. The vapor refrigerant may be provided to a compressor within chiller 22 where the temperature and pressure of the refrigerant are increased (e.g., using a rotating impeller, a screw compressor, a scroll compressor, a reciprocating compressor, a centrifugal compressor, etc.). The compressed refrigerant may be discharged into a condenser within chiller 22. In some embodiments, water (or another chilled fluid) flows through tubes in the condenser of chiller 22 to absorb heat from the refrigerant vapor, thereby causing the refrigerant to condense. The water flowing through tubes in the condenser may be pumped from chiller 22 to a rooftop cooling unit 26 via piping 28. Cooling unit 26 may use fan driven cooling or fan driven evaporation to remove heat from the water. The cooled water in rooftop unit 26 may be delivered back to chiller 22 via piping 30 and the cycle repeats.

Figure 2:
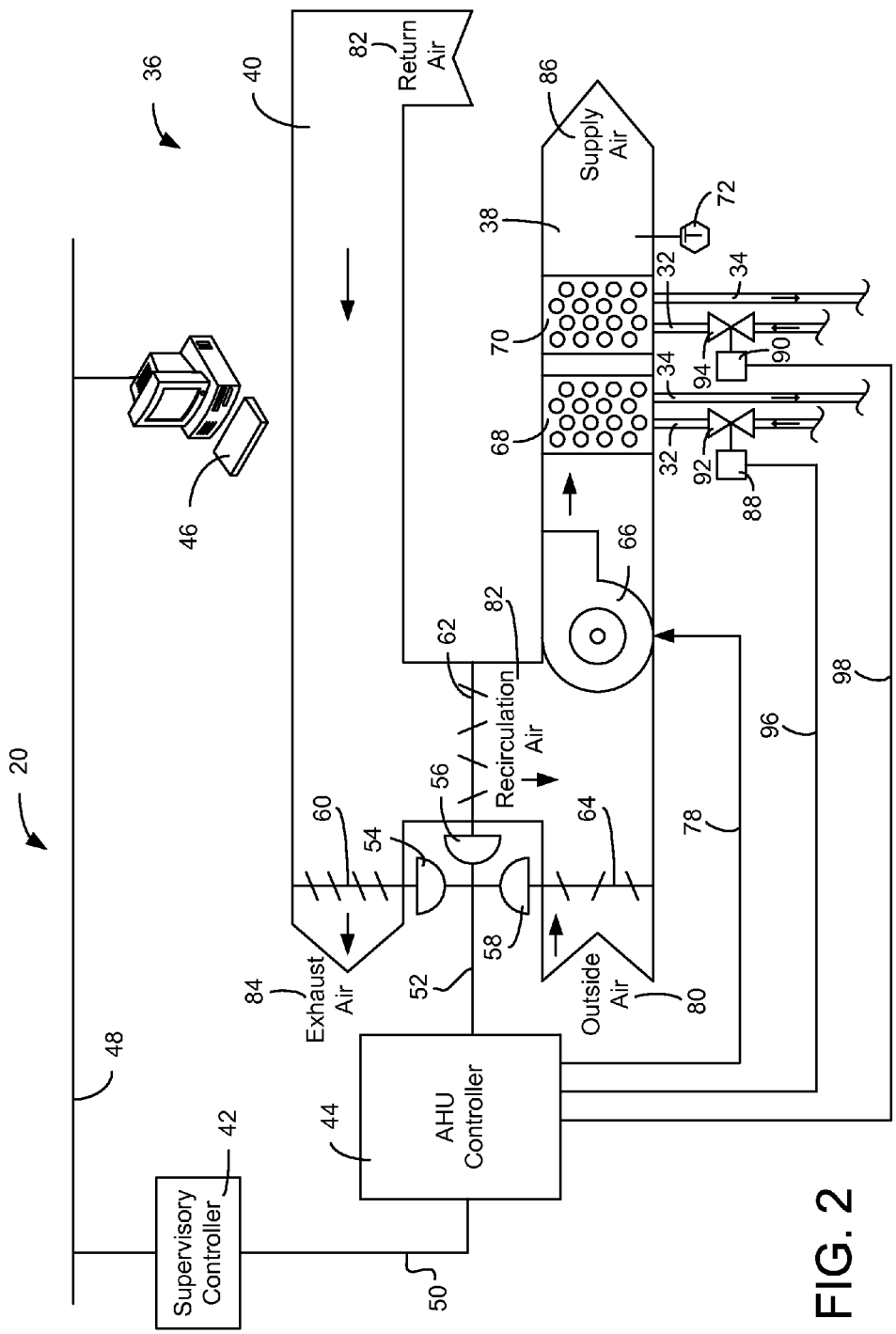
FIG. 2 is a block diagram illustrating a portion of the HVAC system of FIG. 1 in greater detail, according to an exemplary embodiment.

Referring now to FIG. 2, a block diagram of a portion of HVAC system 20 is shown, according to an exemplary embodiment. In FIG. 2, AHU 36 is shown as an economizer type air handling unit. Economizer type air handling units vary the amount of outside air and return air used by the air handling unit for heating or cooling. For example, AHU 36 may receive return air 82 from building 10 via return air duct 40 and may deliver supply air 86 to building 10 via supply air duct 38. AHU 36 may be configured to operate exhaust air damper 60, mixing damper 62, and outside air damper 64 to control an amount of outside air 80 and return air 82 that combine to form supply air 86. Any return air 82 that does not pass through mixing damper 62 may be exhausted from AHU 36 through exhaust damper 60 as exhaust air 84.

Each of dampers 60-64 may be operated by an actuator. As shown in FIG. 2, exhaust air damper 60 may be operated by actuator 54, mixing damper 62 may be operated by actuator 56, and outside air damper 64 may be operated by actuator 58. Actuators 54-58 may communicate with an AHU controller 44 via a communications link 52. AHU controller 44 may be an economizer controller configured to use one or more control algorithms (e.g., state-based algorithms, ESC algorithms, PID control algorithms, model predictive control algorithms, etc.) to control actuators 54-58. An exemplary ESC method that may be used by AHU controller 44 is described in greater detail with reference to FIGS. 6-8.

Actuators 54-58 may receive control signals from AHU controller 44 and may provide feedback signals to AHU controller 44. Feedback signals may include, for example, an indication of a current actuator or damper position, an amount of torque or force exerted by the actuator, diagnostic information (e.g., results of diagnostic tests performed by actuators 54-58), status information, commissioning information, configuration settings, calibration data, and/or other types of information or data that may be collected, stored, or used by actuators 54-58.

Still referring to FIG. 2, AHU 36 is shown to include a cooling coil 68, a heating coil 70, and a fan 66. In some embodiments, cooling coil 68, heating coil 70, and fan 66 are positioned within supply air duct 38. Fan 66 may be configured to force supply air 86 through cooling coil 68 and/or heating coil 70. AHU controller 44 may communicate with fan 66 via communications link 78 to control a flow rate of supply air 86. Cooling coil 68 may receive a chilled fluid from chiller 22 via piping 32 and may return the chilled fluid to chiller 22 via piping 34. Valve 92 may be positioned along piping 32 or piping 34 to control an amount of the chilled fluid provided to cooling coil 68. Heating coil 70 may receive a heated fluid from boiler 24 via piping 32 and may return the heated fluid to boiler 24 via piping 34. Valve 94 may be positioned along piping 32 or piping 34 to control an amount of the heated fluid provided to heating coil 70.

Each of valves 92-94 may be controlled by an actuator. As shown in FIG. 2, valve 92 may be controlled by actuator 88 and valve 94 may be controlled by actuator 90. Actuators 88-90 may communicate with AHU controller 44 via communications links 96-98. Actuators 88-90 may receive control signals from AHU controller 44 and may provide feedback signals to controller 44. In some embodiments, AHU controller 44 receives a measurement of the supply air temperature from a temperature sensor 72 positioned in supply air duct 38 (e.g., downstream of cooling coil 68 and heating coil 70). However, temperature sensor 72 is not required and may not be included in some embodiments.

AHU controller 44 may operate valves 92-94 via actuators 88-90 to modulate an amount of heating or cooling provided to supply air 86 (e.g., to achieve a setpoint temperature for supply air 86 or to maintain the temperature of supply air 86 within a setpoint temperature range). The positions of valves 92-94 affect the amount of cooling or heating provided to supply air 86 by cooling coil 68 or heating coil 70 and may correlate with the amount of energy consumed to achieve a desired supply air temperature. In various embodiments, valves 92-94 may be operated by AHU controller 44 or a separate controller for HVAC system 20.

AHU controller 44 may monitor the positions of valves 92-94 via communications links 96-98. AHU controller 44 may use the positions of valves 92-94 as the variable to be optimized using an ESC control technique. AHU controller 44 may determine and/or set the positions of dampers 60-64 to achieve an optimal or target position for valves 92-94. The optimal or target position for valves 92-94 may be the position that corresponds to the minimum amount of mechanical heating or cooling used by HVAC system 20 to achieve a setpoint supply air temperature (e.g., minimum fluid flow through valves 92-94).

Still referring to FIG. 2, HVAC system 20 is shown to include a supervisory controller 42 and a client device 46. Supervisory controller 42 may include one or more computer systems (e.g., servers, BAS controllers, etc.) that serve as enterprise level controllers, application or data servers, head nodes, master controllers, or field controllers for HVAC system 20. Supervisory controller 42 may communicate with multiple downstream building systems or subsystems (e.g., an HVAC system, a security system, etc.) via a communications link 50 according to like or disparate protocols (e.g., LON, BACnet, etc.).

In some embodiments, AHU controller 44 receives information (e.g., commands, setpoints, operating boundaries, etc.) from supervisory controller 42. For example, supervisory controller 42 may provide AHU controller 44 with a high fan speed limit and a low fan speed limit. A low limit may avoid frequent component and power taxing fan start-ups while a high limit may avoid operation near the mechanical or thermal limits of the fan system. In various embodiments, AHU controller 44 and supervisory controller 42 may be separate (as shown in FIG. 2) or integrated. In an integrated implementation, AHU controller 44 may be a software module configured for execution by a processor of supervisory controller 42.

Client device 46 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 20, its subsystems, and/or devices. Client device 46 may be a computer workstation, a client terminal, a remote or local interface, or any other type of user interface device. Client device 46 may be a stationary terminal or a mobile device. For example, client device 46 may be a desktop computer, a computer server with a user interface, a laptop computer, a tablet, a smartphone, a PDA, or any other type of mobile or non-mobile device.

Figure 3:
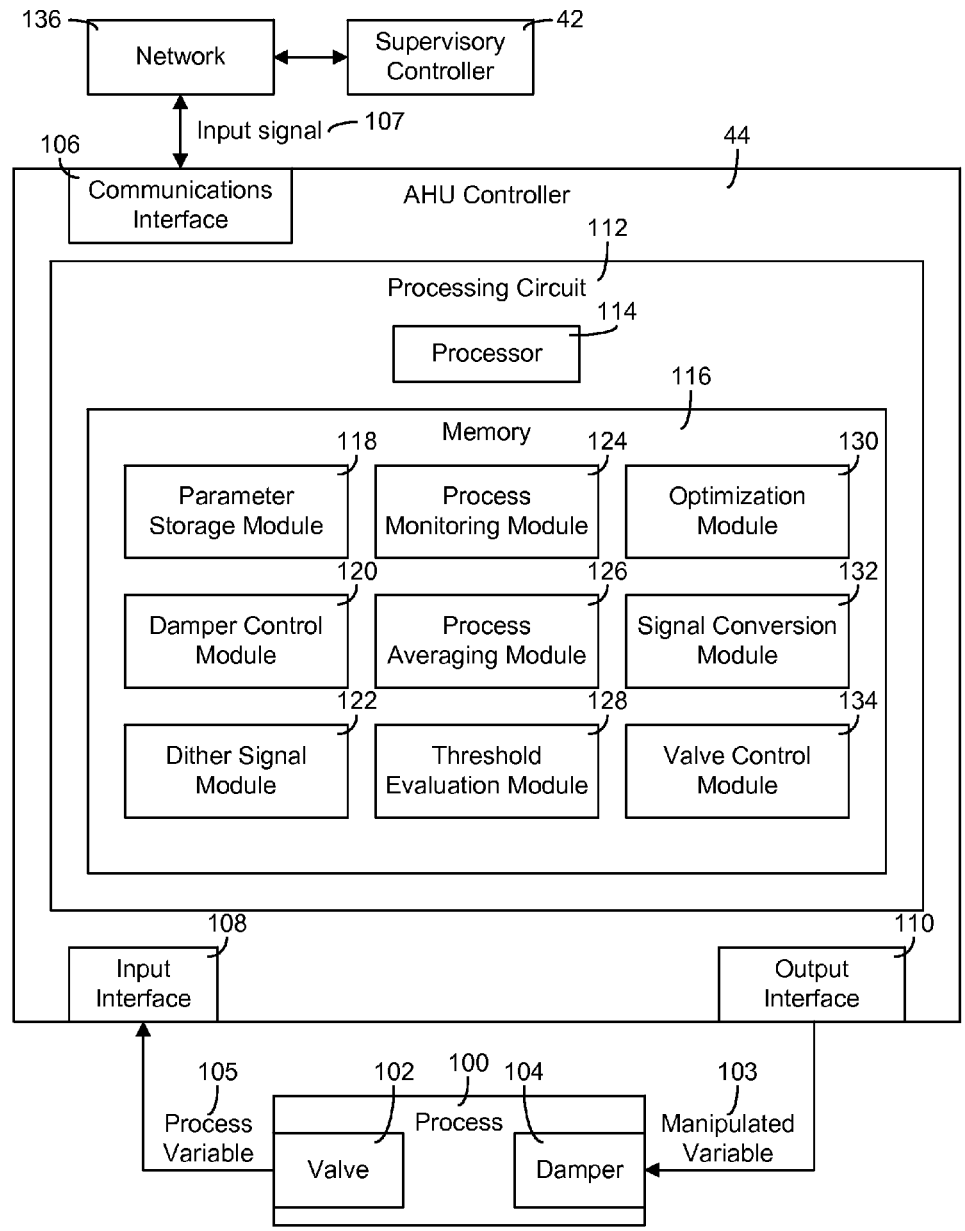
FIG. 3 is a block diagram of a controller that may be used to implement an extremum-seeking control (ESC) strategy in the HVAC system of FIG. 1, according to an exemplary embodiment.

Referring now to FIG. 3, a block diagram illustrating AHU controller 44 in greater detail is shown, according to an exemplary embodiment. AHU controller 44 may be configured to control process 100 using an extremum-seeking control method. Process 100 may be any type of process that can be controlled via a process controller. For example, process 100 may be an air handling unit configured to control temperature within a building space. In other embodiments, process 100 can be or include a chiller operation process, a damper adjustment process, a mechanical cooling process, a ventilation process, or any other process where a variable is manipulated to affect a process output or variable.

AHU controller 44 may control process 100 by controllably changing and outputting a manipulated variable 103 provided to process 100. In some embodiments, manipulated variable 103 is a damper position variable. Manipulated variable 103 may be provided to damper 104 (e.g., one or more of dampers 60-64) or an actuator affecting damper 104 (e.g., one or more of actuators 54-58) as a control signal via output interface 110. Process 100 may use manipulated variable 103 as an input to adjust the position of damper 104 and thereby control the relative proportions of outdoor air 80 and recirculation air 82 provided to a temperature-controlled space.

AHU controller 44 may receive a process variable 105 from process 100 at input interface 108. Process variable 105 may be output by process 100 or observed at process 100 (e.g., via a sensor) and provided to AHU controller 44. In some embodiments, process variable 105 is a measured or observed position of valve 102 (e.g., one of valves 92-94). In other embodiments, process variable 105 is a measured or calculated amount of power consumption, a fan speed, a damper position, a temperature, or any other variable that can be measured or calculated by process 100. Process variable 105 may be the variable that AHU controller 44 seeks to optimize via an extremum-seeking control process.

AHU controller 44 includes logic that adjusts manipulated variable 103 to achieve a target outcome for process 100 (e.g., a target value or optimum value for process variable 105). In some operating modes, the control logic implemented by AHU controller 44 utilizes feedback of an output variable. The logic implemented by AHU controller 44 may also or alternatively vary manipulated variable 103 based on a received input signal 107 (e.g., a setpoint). Input signal 107 may be received from a user control (e.g., a thermostat), a supervisory controller (e.g., supervisory controller 42), or another upstream device via a communications network 136 (e.g., a BACnet network, a LonWorks network, a LAN, a WAN, the Internet, a cellular network, etc.).

Still referring to FIG. 3, AHU controller 44 is shown to include a communications interface 106, an input interface 108, and an output interface 110. Interfaces 106-110 may be or include any number of jacks, wire terminals, wire ports, wireless antennas, or other communications interfaces for communicating information or control signals (e.g., a control signal of the manipulated variable output at interface 110, sensor information received at input interface 108, setpoint information received at communications interface 106, etc.). Interfaces 106 and 108 may be the same type of devices or different types of devices. For example, input interface 108 may be configured to receive an analog feedback signal (e.g., an output variable, a measured signal, a sensor output, a controlled variable) from a controlled process component (or a sensor thereof) while communications interface 106 may be configured to receive a digital setpoint signal from upstream supervisory controller 42 via network 136. Output interface 110 may be a digital output (e.g., an optical digital interface) configured to provide a digital control signal (e.g., a manipulated variable) to a controlled process component. In other embodiments, output interface 110 is configured to provide an analog output signal.

In some embodiments interfaces 106-110 can be joined as one or two interfaces rather than three separate interfaces. For example, communications interface 106 and input interface 108 may be combined as one Ethernet interface configured to receive network communications from supervisory controller 42. In some embodiments, supervisory controller 42 provides both the setpoint and process feedback via an Ethernet network (e.g., network 136). In such an embodiment, output interface 110 may be specialized for the controlled process component of process 100. In yet other embodiments, output interface 110 can be another standardized communications interface for communicating data or control signals. Interfaces 106-110 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Still referring to FIG. 3, AHU controller 44 is shown to include a processing circuit 112 having a processor 114 and memory 116. Processor 114 may be a general purpose or specific purpose processor, an application specific integrated circuit (ASIC), one or more field programmable gate arrays (FPGAs), a group of processing components, or other suitable processing components. Processor 114 is configured to execute computer code or instructions stored in memory 116 or received from other computer readable media (e.g., CDROM, network storage, a remote server, etc.).

Memory 116 may include one or more devices (e.g., memory units, memory devices, storage devices, etc.) for storing data and/or computer code for completing and/or facilitating the various processes described in the present disclosure. Memory 116 may include random access memory (RAM), read-only memory (ROM), hard drive storage, temporary storage, non-volatile memory, flash memory, optical memory, or any other suitable memory for storing software objects and/or computer instructions. Memory 116 may include database components, object code components, script components, or any other type of information structure for supporting the various activities and information structures described in the present disclosure. Memory 116 may be communicably connected to processor 114 via processing circuit 112 and may include computer code for executing (e.g., by processor 114) one or more processes described herein.

In brief overview, processing circuit 112 may be configured to monitor process variable 105 (e.g., valve position) and calculate average values for process variable 105 for different values of manipulated variable 103 (e.g., damper position). Processing circuit 112 may hold manipulated variable 103 at a first value for a predetermined time period. The first value may be a previously-determined optimum position and/or an extremum position for damper 104 (e.g., maximum open or minimum open). Processing circuit 112 may apply a dither signal to manipulated variable 103 for a relatively shorter period. The dither signal may cause manipulated variable 103 to deviate from the first value by an amount defined by a pulse size parameter (e.g., 15% of the total range of damper 104).

Processing circuit 112 may monitor the effect of the dither signal on process variable 105. If process variable 105 moves toward an optimal or target value as a result of the dither signal, processing circuit 112 may cause the value of manipulated variable 103 to change to a second value (e.g., a value corresponding to an extremum position, an intermediate position, etc.) in the direction of the deviation caused by the dither signal. If process variable 105 does not move toward the optimal or target value as a result of the dither signal (e.g., process variable 105 remains unchanged or moves in the opposite direction), processing circuit 112 may cause the value of manipulated variable 103 to remain unchanged or may change the value of manipulated variable 103 to a third value (e.g., a value corresponding to another extremum position, an intermediate position, etc.) opposite the direction of the deviation caused by the dither signal. The ESC method implemented by processing circuit 112 may be carried out according to instructions stored in memory 116, as described in greater detail below.

Still referring to FIG. 3, memory 116 is shown to include a parameter storage module 118. Parameter storage module 118 may be configured to store various parameters used in the ESC method implemented by processing circuit 112. Parameter storage module 118 may store a "period" parameter defining the total duration of an evaluation cycle. Each evaluation cycle may include a first portion during which manipulated variable 103 is held at a constant value and a second portion during which manipulated variable 103 is modulated by a dither signal. At the end of the cycle, manipulated variable 103 may be returned to the constant value or set to a new constant value, based on the response of process variable 105.

Parameter storage module 118 may store a "pulse" parameter defining the maximum duration that the dither signal may be applied to manipulated variable 103. When the dither signal is applied to manipulated variable 103, process variable 105 may be monitored for a change exceeding a threshold value defined by a threshold parameter. The threshold parameter may define upper and/or lower bounds on the value of process variable 105. In some embodiments, the threshold parameter is a fraction or percentage (e.g., 2.5%, 5%, 10%, 15%, 30%, etc.) of the total range of possible values for process variable 105. In other embodiments, the threshold parameter is a multiplier that is applied to a current value of process variable 105 to determine the upper or lower bounds (e.g., +/−2.5%, +/−5%, +/−10%, +/−15%, +/−30%, etc.). Processing circuit 112 may set the value of manipulated variable 103 based on whether the value of process variable 105 crosses a threshold value defined by the threshold parameter in response to the dither signal.

Parameter storage module 118 may store a "pulse_size" parameter defining an amplitude of the dither signal. In some embodiments, the dither signal is a square wave applied to the current value of manipulated variable 103. If manipulated variable 103 is at an extremum value, the dither signal may be half of a square wave (e.g., only the positive or negative half of the square wave). The pulse_size parameter defines an amplitude of the square wave. In some embodiments, the pulse_size parameter is a fraction or percentage of the total range of possible values for manipulated variable 103 (e.g., 2.5%, 5%, 10%, 15%, 30%, etc.). For example, if the range of possible values for manipulate variable 103 is between 0 and 1 inclusive (i.e., a total range of 1.0), a pulse_size of 0.15 may cause the amplitude of the dither signal to be 0.15 (i.e., 1.0*0.15=0.15). In other embodiments, the pulse_size parameter is a multiplier that is applied to a current value of manipulated variable 103 (e.g., +/−2.5%, +/−5%, +/−10%, +/−15%, +/−30%, etc.). For example, if the current value of manipulated variable 103 is 0.8, a pulse_size of 0.15 may cause the amplitude of the dither signal to be 0.12 (i.e., 0.8*0.15=0.12). Dither signal generation and application is described in greater detail with reference to dither signal module 122.

Parameter storage module 118 may store temporary variables used by processing circuit 112 during the ESC process. Temporary variables may include, for example, the value of process variable 105 (e.g., a measured position of valve 102 "valve_pos"), the value of manipulated variable 103 (e.g., a normalized or modified value representing the position of damper 104 "damper_pos"), a first calculated value "valve_avg1" representing the average value of valve_pos during a first averaging portion of the evaluation period during which the dither signal is not applied, a second calculated value "valve_avg2" representing the average value of valve_pos during a second averaging portion of the evaluation period during which the dither signal is applied, a time parameter "time" representing the elapsed time since the beginning of the current period, and iterative variables "nsamp1" and "nsamp2" representing the number of iterations that have occurred during various portions of the evaluation period. The usage of such parameters in the ESC method is described in greater detail with reference to process averaging module 126.

In some embodiments, parameter storage module 118 contains parameters used by processing circuit 112 to convert a normalized control signal value into a value for manipulated variable 103 that can be applied to process 100. For example, the ESC process performed by processing circuit 112 may generate normalized control signals having values between 0 and 1 (i.e., 0≤damp_pos≤1) with a normalized pulse_size of 0.15. However, various dampers may have different permitted ranges (e.g., between 20% open and 100% open, between 10% open and 100% open, between 15% open and 90% open, etc.) based on the minimum ventilation requirements for the temperature-controlled space or other damper-specific or space-specific attributes. The conversion parameters stored in parameter storage module 118 may allow processing circuit 112 to convert a normalized value of damp_pos into an appropriate manipulated variable 103 that can be applied as a control signal to damper 104. Control signal conversion is described in greater detail with reference to signal conversion module 132.

Still referring to FIG. 3, memory 116 is shown to include a damper control module 120. Damper control module 120 may be configured to generate a control signal for damper 104. In some embodiments, damper control module 120 determines the value of the damper_pos variable, which may have a normalized value between 0 and 1. A value of damper_pos=0 may correspond to damper position that allows a minimum amount of air to pass through the damper. In various implementations, the minimum damper position may be 0% open (e.g., for data centers or other spaces for which ventilation is not required) or a non-zero value such as 10% open or 20% open, based on the ventilation requirements of the temperature-controlled space. A value of damper_pos=1 may correspond to a damper position that allows a maximum amount of air to pass through the damper. In various implementations, the maximum damper position may be 100% open or less than 100% open (e.g., 90% open, 80% open, etc.), based on damper-specific or installation-specific requirements (e.g., actuator range restrictions, damper range restrictions, etc.). The value of damper_pos generated by damper control module 120 may be converted to a manipulated variable 103 by signal conversion module 132 to accommodate various dampers and/or processes.

Damper control module 120 may set damper_pos to a first value at the beginning of each evaluation period. The first value may be a previously-determined optimal value for damper_pos, an extremum of damper_pos (i.e., damper_pos=0 or damper_pos=1), and/or a value representing a current position of damper 104. Damper control module 120 may hold damper_pos at the first value for a first portion of the evaluation period. In some embodiments, the first portion of the evaluation period is the total duration of the evaluation period minus the pulse duration (i.e., period−pulse) or a minus a multiplier of the pulse duration (e.g., period−2*pulse, period−3*pulse, etc.). Damper control module 120 may maintain damper_pos at the first value until the time variable exceeds the duration of the first portion of the evaluation period (e.g., time≥period−pulse). Upon expiration of the first portion of the evaluation period (i.e., at time=period−pulse), damper control module 120 may apply the dither signal to modify damper_pos.

Still referring to FIG. 3, memory 116 is shown to include a dither signal module 122. Dither signal module 122 may be configured to generate a dither signal that is applied to damper_pos. Dither signal module 122 may use the pulse parameter and the pulse_size parameter stored in parameter storage module 118 to generate the dither signal. The pulse parameter may define a maximum duration of the dither signal and the pulse_size parameter may define an amplitude of the dither signal. In some embodiments, the dither signal is a square wave applied to the current value of damper_pos. In other embodiments, the dither signal is a sinusoidal wave, a triangle wave, a sawtooth wave, or any other type of modification that can be applied to damper_pos. If damper_pos is at an extremum value, the dither signal may be half of the applied waveform.

In some embodiments, the dither signal is a constant addition or subtraction from the current value of damper_pos. The pulse_size parameter may define a magnitude of the addition or subtraction. For example, a pulse_size of 0.15 may cause dither signal module 122 to add or subtract 0.15 from the current value of damper_pos. In other embodiments, the pulse_size parameter is a multiplier that is applied to a current value damper_pos. For example, if the current value of damper_pos is 0.8, a pulse_size of 0.15 may cause dither signal module 122 to add or subtract 0.12 (i.e., 0.8*0.15=0.12) from the current value of damper_pos.

Dither signal module 122 may apply the dither signal to damper_pos at the beginning of a second portion of the evaluation period. The second portion of the evaluation period may begin when the time variable exceeds the first portion of the evaluation period (e.g., time≥period−pulse) and may end at time=period. Upon expiration of the second portion of the evaluation period, dither signal module 122 may remove the dither signal from damper_pos. Dither signal module 122 may apply the dither signal to damper_pos for a maximum duration defined by the pulse parameter. If the dither signal causes the value (or average value) of process variable 105 to change by an amount exceeding a threshold (e.g., minimum or maximum bounds, a percent change, etc.), dither signal module 122 may remove the dither signal prior to the maximum duration of the pulse (i.e., prior to time=period). However, if the dither signal does not cause the value of process variable 105 to change by an amount exceeding the threshold, dither signal module 122 may cause the dither signal to be applied for the entire duration of the pulse.

Still referring to FIG. 3, memory 116 is shown to include a process monitoring module 124. Process monitoring module 124 may be configured to use data received at input interface 108 to monitor or calculate the current value of process variable 105. In some embodiments, process variable 105 is measured at process 100 (e.g., a measured valve position, a measured temperature, etc.) and communicated to process monitoring module 124 via input interface 108. In other embodiments, process variable 105 is calculated by process monitoring module 124 using other data measurements received at input interface 108 and/or communications interface 106.

Process monitoring module 124 may use the value of process variable 105 to calculate a value for the valve_pos variable. In some embodiments, the valve_pos variable is a normalized value (e.g., between 0 and 1) representing the current position of valve 102. Process monitoring module 124 may convert a data signal received from process 100 into a normalized value for valve_pos using a conversion table, conversion formula, or other parameters of valve 102 or process 100. A value of valve_pos=0 may correspond to a first extremum position for valve 102 (e.g., completely closed, at one end of a range of valve positions, etc.), whereas a value of valve_pos=1 may correspond to a second extremum position for valve 102 (e.g., completely open, at the other end of the range of valve positions, etc.). The range of valve positions may be defined by characteristics of valve 102, an actuator controlling valve 102 (e.g., actuator range restrictions), or any other attribute of valve 102 or process 100.

In some embodiments, process monitoring module 124 stores the current value of valve_pos in memory 116 with a corresponding timestamp. In other embodiments, process monitoring module 124 provides the current value of valve_pos to process averaging module 126 for use in an iterative averaging process. Advantageously, the iterative averaging process may facilitate averaging multiple values of valve_pos without requiring each value of valve_pos to be stored in memory 116.

Still referring to FIG. 3, memory 116 is shown to include a process averaging module 126. Process averaging module 126 may be configured to average values for the valve_pos variable during various portions of the evaluation period. In some embodiments, process averaging module 126 calculates a first average value valve_avg1 for valve_pos during a first averaging portion of the evaluation period and a second average value valve_avg2 for valve_pos during a second averaging portion of the evaluation period.

The first averaging portion of the evaluation period may include all of the time steps of the evaluation period for which the time parameter is greater than or equal to the quantity period−2*pulse but less than the quantity period−pulse (i.e., period−2*pulse≤time<period−pulse). At each time step in the first averaging portion of the evaluation period, process averaging module 126 may calculate a new value for valve_avg1 using the following equation:

$$\text{valve\_avg1}_{k+1} = \text{valve\_avg1}_k + \frac{\text{valve\_pos}_k - \text{valve\_avg1}_k}{\text{n\_samp1}_k}$$

where valve_avg1$_k$ is the current value of valve_avg1 (i.e., at the current time step k), n_samp1$_k$ is number of time steps k that have elapsed since the time period−2*pulse, valve_pos$_k$ is the current value of the variable valve_pos provided by process monitoring module 124 at time step k, and valve_avg1$_{k+1}$ is the new value of valve_avg1 at time step k+1. At each time step in the first averaging portion of the evaluation period, process averaging module 126 may update the value of n_samp1 using the following equation:

$$n\_\text{samp1}_{k+1} = n\_\text{samp1}_k + 1$$

Upon expiration of the first averaging portion of the evaluation period (i.e., at time=period−pulse), the value of valve_avg1 represents the average value of valve_pos over a time period of duration pulse immediately prior to the application of the dither signal. In other words, the value valve_avg1 is the average of valve_pos between the times t=period−2*pulse and t=period−pulse. The value of valve_avg1 functions as a reference value for valve_pos over a time period during which the dither signal is not applied.

The second averaging portion of the evaluation period may include all of the time steps of the evaluation period for which the time parameter is greater than or equal to the quantity period−pulse but less than the total duration of the evaluation period (i.e., period−pulse≤time<period). At each time step in the second averaging portion of the evaluation period, process averaging module 126 may calculate a new value for valve_avg2 using the following equation:

$$\text{valve\_avg2}_{k+1} = \text{valve\_avg2}_k + \frac{\text{valve\_pos}_k - \text{valve\_avg2}_k}{\max(1, \text{n\_samp2}_k - 1)}$$

where valve_avg2$_k$ is the current value of valve_avg2 (i.e., at the current time step k), n_samp2$_k$ is number of time steps k that have elapsed since the time period−pulse, valve_pos$_k$ is the current value of the variable valve_pos provided by process monitoring module 124 at time step k, and valve_avg2$_{k+1}$ is the new value of valve_avg2 at time step k+1. At each time step in the second averaging portion of the evaluation period, process averaging module 126 may update the value of n_samp2 using the following equation:

$$n\_\text{samp2}_{k+1} = n\_\text{samp2}_k + 1$$

Upon expiration of the second averaging portion of the evaluation period (i.e., at time=period), the value of valve_avg2 represents the average value of valve_pos over a time period of duration pulse while the dither signal is applied. In other words, the value valve_avg2 is the average of valve_pos between the times t=period−pulse and t=period. The value of valve_avg2 can be compared with the value of valve_avg1 (e.g., by processing circuit 112) to determine whether the dither signal results in a significant and/or desirable change in process variable 105, as represented by the variable valve_pos.

Still referring to FIG. 3, memory 116 is shown to include a threshold evaluation module 128. Threshold evaluation module 128 may be configured to determine whether the dither signal causes a significant change in process variable 105. A change in process variable 105 or any other value (e.g., valve_avg1, valve_avg2, valve_pos, manipulated variable 103, etc.) may be considered significant if the change exceeds a threshold value. The threshold value may be defined by the threshold parameter stored in parameter storage module 118.

In some embodiments, threshold evaluation module 128 calculates the difference between valve_avg1 and valve_avg2 to determine an average amount by which the variable valve_pos changes as a result of the dither signal. If the difference between valve_avg1 and valve_avg2 exceeds the value of the threshold parameter, threshold evaluation module 128 may determine that the dither signal causes a significant change in process variable 105 and/or the value of valve_pos. The threshold parameter may be a function of valve_avg1, or any other fixed or adaptive threshold. In other embodiments, threshold evaluation module 128 uses the valve of valve_avg1 to define upper and/or lower bounds that function as thresholds for valve_avg2. The bounds may be centered around the value of valve_avg1 plus or minus a fixed percentage (e.g., valve_avg1±x %* valve_avg1). In various embodiments, the percentage x % is approximately 2.5%, 5%, 7.5%, 10%, etc.

In some embodiments, threshold evaluation module 128 determines a direction of the calculated change. If the direction of the change causes process variable 105 and/or the value of valve_pos to move toward an optimal or target value (e.g., a decrease in mechanical cooling required, a decrease in energy consumption, a movement of valve 102 toward fully closed, a movement toward a setpoint, etc.), threshold evaluation module 128 may determine that the direction of the change is desirable (e.g., beneficial to the operation of process 100, more energy efficient, etc.). If the direction of the change causes process variable 105 and/or the value of valve_pos to move away from the optimal or target value (e.g., an increase in mechanical cooling required, an increase in energy consumption, a movement of valve 102 toward fully open, a movement away from a setpoint, etc.), threshold evaluation module 128 may determine that the direction of the change is undesirable (e.g., not beneficial to the operation of process 100, less energy efficient, etc.). In various embodiments, threshold evaluation module 128 may store the difference between valve_avg1 and valve_avg2, a percentage change from valve_avg1 to valve_avg2, an indication of whether the change is significant, and/or a direction of the change in memory 116 or report such results to optimization module 130.

Still referring to FIG. 3, memory 116 is shown to include an optimization module 130. Optimization module 130 may be configured to optimize manipulated variable 103 based on the effect of the dither signal on process variable 105. If the dither signal moves manipulated variable 103 in a first direction (e.g., decreases from a value of 1.0 to a value of 0.85) and causes process variable 105 to move toward an optimal or target value by an amount exceeding the threshold parameter (e.g., |valve_avg2−valve_avg1|>threshold), optimization module 130 may adjust manipulated variable 103 in the first direction (e.g., decreasing manipulated variable 103). However, if the dither signal does not cause process variable 105 to move toward the optimal or target value by an amount exceeding the threshold parameter (e.g., |valve_avg2−valve_avg1|≤threshold), optimization module 130 may not adjust manipulated variable 103. In some embodiments, if the dither signal moves manipulated variable 103 in a first direction (e.g., decreases from a value of 0.80 to a value of 0.65) and causes process variable 105 to move away from the optimal or target value by an amount exceeding the threshold, optimization module 130 may adjust manipulated variable 103 in a second direction, opposite the first direction (e.g., increasing manipulated variable 103).

In some embodiments, optimization module 130 uses an assumption that the optimal value of manipulated variable 103 is at one of the extremes. When optimization module 130 assumes that the optimal value of manipulated variable 103 is at one of the extremes, optimization module 130 may change the current value of manipulated variable 103 from the one of the extremes to the other extreme in response to a determination that the dither signal causes process variable 105 to move toward the optimal or target value by an amount exceeding the threshold parameter. In other embodiments, optimization module 130 may set manipulated variable 103 to any of a variety of intermediate values between the extremes. For example, if the dither signal moves manipulated variable 103 toward an intermediate value and causes process variable 105 to move toward an optimal or target value by an amount exceeding the threshold parameter, optimization module 130 may set manipulated variable 103 to the intermediate value. In various embodiments, any number of intermediate values or levels for manipulated variable 103 may exist between the extremes.

In some embodiments, optimization module 130 uses the results generated by threshold evaluation module 128 to determine whether to adjust the current value of manipulated variable 103. Optimization module 130 may determine an optimal or target value for valve_pos based on the optimal or target value of process variable 105 (e.g., using a conversion chart or formula as described with reference to process monitoring module 124). Optimization module 130 may determine whether the optimal or target value for valve_pos is greater than or less than the current value of valve_pos.

If the optimal or target value for valve_pos is greater than the current value of valve_pos, optimization module 130 may determine that an increase in the current value of valve_pos is desirable. When an increase in the current value of valve_pos is desirable, optimization module 130 may adjust manipulated variable 103 in the direction of the change caused by the dither signal in response to a determination that valve_avg2 is greater than valve_avg1 by an amount exceeding the threshold (i.e., valve_avg2−valve_avg1>threshold). The threshold may be, for example, a function of valve_avg1 (e.g., 0.025*valve_avg1, etc.). If the optimal or target value for valve_pos is less than the current value of valve_pos, optimization module 130 may determine that a decrease in the current value of valve_pos is desirable. When a decrease in the current value of valve_pos is desirable, optimization module 130 may adjust manipulated variable 103 in the direction of the change caused by the dither signal in response to a determination that valve_avg2 is less than valve_avg1 by an amount exceeding the threshold (i.e., valve_avg1−valve_avg2>threshold). If the difference between valve_avg2 and valve_avg1 does not exceed the threshold (i.e., |valve_avg2−valve_avg1|≤threshold), optimization module 130 may not adjust manipulated variable 103.

Still referring to FIG. 3, memory 116 is shown to include a signal conversion module 132. Signal conversion module 132 may be configured to convert a normalized control signal value for the variable damp_pos into a value for manipulated variable 103 that can be applied to process 100. For example, damper control module 120, dither signal module 122, and optimization module 130 may generate normalized control signals having values between 0 and 1 (i.e., 0≤damp_pos≤1) with a normalized pulse_size of 0.15. However, various dampers may have different permitted ranges (e.g., between 20% open and 100% open, between 10% open and 100% open, between 15% open and 90% open, etc.) based on the minimum ventilation requirements for the temperature-controlled space or other damper-specific or space-specific attributes. Signal conversion module 132 may convert a normalized value of damp_pos or pulse_size into an appropriate manipulated variable 103 that can be applied as a control signal to damper 104.

In some embodiments, signal conversion module 132 converts normalized values of damp_pos into a control signal for damper 104 using the following equation:

$$d_i = 100 * (damp\_pos * (damper\_max - damper\_min) + damper\_min)$$

where damper_max is the maximum percentage that damper 104 can open (e.g., 100% open=1, 80% open=0.8, etc.), damper_min is the minimum percentage that damper 104 can open (e.g., 0% open=0.0, 20% open=0.2, etc.), and $d_i$ is the signal input for damper 104.

The value for $d_i$ represents damp_pos as a percentage within the range damper_min . . . damper_max. For example, if damper 104 can be operated within the range 20% open and 100% open, then damper_max=1.0, damper_min=0.2, and the conversion equation reduces to:

$$d_i = 100 * (damp\_pos * 0.8 + 0.2)$$

Using this simplified equation, if the value of damp_pos output by optimization module 130 is 0.5, signal conversion module 132 may calculate a value of $d_i = 100*(0.5*0.8+0.2) = 60$, indicating that damper 104 should be set to a position of 60% open (i.e., halfway between the minimum damper position of 20% open and the maximum damper position of 100% open).

Still referring to FIG. 3, memory 116 is shown to include a valve control module 134. Valve control module 134 may be configured to generate control signals for valve 102. In some embodiments, valve control module 134 adjusts the position of valve 102 to increase the amount of chilled or heated fluid provided to AHU 36. Valve control module 134 may receive a measurement of the supply air temperature from a temperature sensor 72 positioned in supply air duct 38 (e.g., downstream of cooling coil 68 and heating coil 70). Valve control module 134 may operate actuators 88-90 to modulate an amount of heating or cooling provided to supply air 86 to achieve a setpoint temperature for supply air 86 or to maintain the temperature of supply air 86 within a setpoint temperature range.

Figure 4:
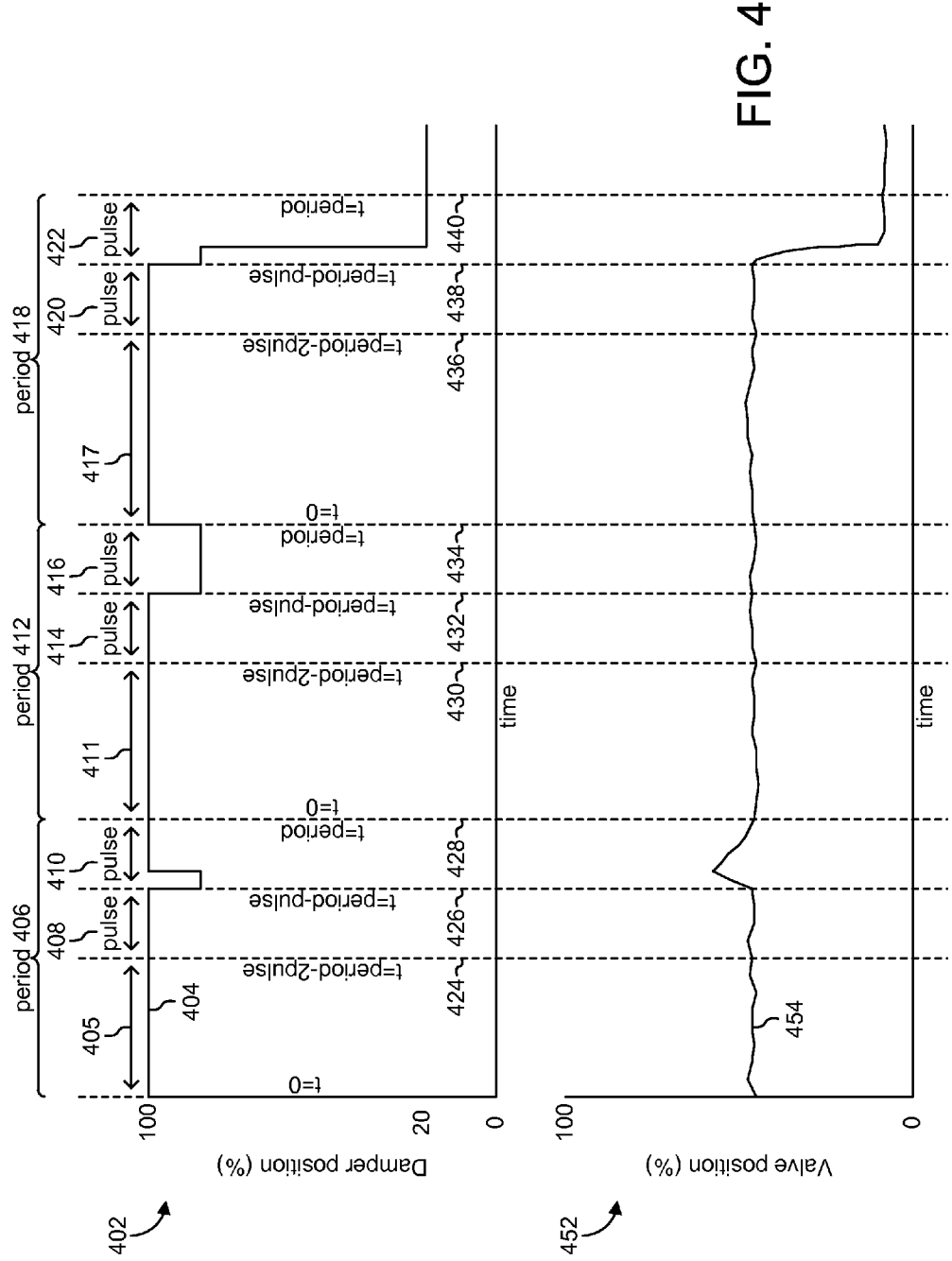
FIG. 4 is pair of graphs and illustrating the ESC strategy performed by the controller of FIG. 3, according to an exemplary embodiment.

Referring now to FIG. 4, a pair of graphs 402 and 452 illustrating the extremum-seeking control strategy performed by AHU controller 44 is shown, according to an exemplary embodiment. Graph 402 depicts damper position 404 as a function of time throughout three evaluation periods 406, 412, and 418. Damper position 404 may be a measured or calculated variable representing the position of damper 104 (e.g., manipulated variable 103, damper_pos, etc.) as described with reference to FIG. 3. In graph 402, the value of damper position 404 represents a percentage that the damper is open. For example, a damper position 404 of 0% indicates that the damper is completely closed, whereas a damper position 404 of 100% indicates that the damper is completely open. The damper for which damper position 404 is plotted in graph 402 has a minimum position of 20% open and a maximum position of 100% open.

Graph 452 depicts valve position 454 as a function of time throughout evaluation periods 406, 412, and 418. Valve position 454 may be a measured or calculated variable representing the position of valve 102 (e.g., process variable 105, valve_pos, etc.) as described with reference to FIG. 3. In graph 452, the value of valve position 454 represents a percentage that the valve is open. For example, a valve position 454 of 0% indicates that the valve is completely closed, whereas a valve position 454 of 100% indicates that the valve is completely open. The valve for which valve position 454 is plotted in graph 452 is capable of being operated throughout the entire positional range between 0% open 100% open.

Still referring to FIG. 4, each of evaluation periods 406, 412, and 418 has a total duration defined by the period parameter stored in parameter storage module 118. Each of evaluation periods 406, 412, and 418 may be divided into a plurality of shorter periods. For example, evaluation period 406 is shown divided into holding period 405, first averaging period 408, and second averaging period 410; evaluation period 412 is shown divided into holding period 411, first averaging period 414, and second averaging period 416; and evaluation period 418 is shown divided into holding period 417, first averaging period 420, and second averaging period 422. Averaging periods 408, 410, 414, 416, 420, and 422 have a duration defined by the pulse parameter. Holding periods 405, 411, and 417 have a duration of period−2*pulse.

At the beginning of each evaluation period 406, 412, and 418, the time parameter is reset to zero. At the end of each holding period 405, 411, and 417 (i.e., at times 424, 430, and 436), the time parameter has a value of period−2*pulse. At the end of each first averaging period 408, 414, and 420 (i.e., at times 426, 432, and 438), the time parameter has a value of period−pulse. At the end of each second averaging period 410, 416, and 422 (i.e., at times 428, 434, and 440), the time parameter reaches a value of period and is subsequently reset to zero.

During holding periods 405, 411 and 417, damper position 404 may be held at a constant value (e.g., by damper control module 120). The value at which damper position 404 is held may be a previously-determined optimal value for damper position 404, an extremum of damper position 404 (100% or 0%), and/or a value representing a current position of damper 104. In FIG. 4, damper position 404 is held at an extremum value of 100% throughout holding periods 405, 411 and 417.

At the end of each holding period 405, 411, and 417 (i.e., at times 424, 430, and 436), process monitoring module 124 may begin monitoring the value of valve position 454. Process averaging module 126 may use the values of valve position 454 during each first averaging period 408, 414, and 420 to calculate the value valve_avg1 as described with reference to FIG. 3. During first averaging periods 408, 414, and 420, damper control module 120 may continue to hold damper position 404 at the constant value (e.g., 100%, 0%, an intermediate value, etc.).

At the end of each first averaging period 408, 414, and 420 (i.e., at times 426, 432, and 438), dither signal module 122 may apply the dither signal to damper position 404. In FIG. 4, the dither signal causes the value of damper position 404 to decrease by approximately 15% (i.e., from 100% to 85%). In various evaluation periods, the dither signal may cause the value of damper position 404 to decrease, increase, or both (e.g., if the dither signal is an oscillating waveform). If damper position 404 is held at 0% during holding periods 405, 411, and 417, the dither signal may cause damper position 404 to increase to approximately 15%. The amount of the increase or decrease in damper position 404 caused by the dither signal may be different (e.g., 5%, 10%, 20%, 30%, etc.) in various embodiments and may be adjusted by defining the pulse_size parameter in parameter storage module 118.

During each of second averaging periods 410, 416, and 422, process monitoring module 124 may continue monitoring the value of valve position 454. Process averaging module 126 may use the values of valve position 454 during each second averaging period 410, 416, and 422 to calculate the value valve_avg2 as described with reference to FIG. 3.

During second averaging periods 410, 416, and 422, threshold evaluation module 128 may calculate the difference between valve_avg2 and valve_avg1 and compare the difference with the threshold parameter. In various embodiments, the threshold parameter may be a fixed value, an adaptive value, or a function of valve_avg1 (e.g., 0.025*valve_avg1). Dither signal module 122 may remove the dither signal from damper position 404 if the threshold condition is satisfied (i.e., |valve_avg2−valve_avg1|>threshold) at any time during second averaging periods 410, 416, and 422. If the difference between valve_avg2 and valve_avg1 exceeds the threshold parameter, threshold evaluation module 128 may determine whether the direction of the change is toward or away from the optimal or target value of valve position 454. In the embodiment illustrated in FIG. 4, valve position 454 moves toward the optimal value (i.e., 0%) as valve position 454 decreases because the value of valve position 454 correlates with energy consumption.

Still referring to FIG. 4, each of the three evaluation periods 406, 412, and 418 illustrates a different result of applying the dither signal to damper position 404. In evaluation period 406 the dither signal causes the value of valve position 454 to increase. During second averaging period 410, threshold evaluation module 418 may determine that the value of valve_avg2 exceeds the value of valve_avg1 by the threshold amount. Since an increase in valve position 454 represents movement away from the optimal value, optimization module 130 may determine that such movement is undesirable and return the value of damper position 404 to its previous value (i.e., 100% in FIG. 4). The dither signal is removed from damper position 404 prior to the end of second averaging period 410 because the threshold condition is satisfied during second averaging period 410.

In evaluation period 412, the dither signal does not cause a significant change in the value of valve position 454. Accordingly, threshold evaluation module 418 may determine that the difference in value between valve_avg2 and valve_avg1 does not exceed the threshold value at any time during second averaging period 416. The dither signal is applied to damper position 404 throughout second averaging period 416 because the threshold condition is not satisfied during second averaging period 416. At the end of second averaging period 416, optimization module 130 may determine that the change in damper position 404 caused by the dither signal does not significantly improve the value of valve position 454 and may return damper position 404 to its previous value (i.e., 100%).

In evaluation period 418 the dither signal causes the value of valve position 454 to decrease. During second averaging period 422, threshold evaluation module 418 may determine that the value of valve_avg2 is less than the value of valve_avg1 by the threshold amount. Since a decrease in valve position 454 represents movement toward the optimal value, optimization module 130 may determine that such movement is desirable and may adjust the value of damper position 404 in the direction of the change caused by the dither signal (e.g., decrease to 20% in FIG. 4). The dither signal is removed from damper position 404 prior to the end of second averaging period 422 because the threshold condition is satisfied during second averaging period 422.

In the embodiment illustrated in FIG. 4, damper position 404 is switched between the extreme values (i.e., 100% or 20%) in response to a determination that the other extreme value will move valve position 454 toward the optimum. In other embodiments, damper position 404 may be adjusted to any of a variety of intermediate values (e.g., 30%, 40%, 50%, 60%, etc.) in addition to the extreme values. For example, optimization module 130 may set damper position 404 to a closest value in the direction of the change caused by the dither signal in response to a determination that the dither signal causes valve position 454 to move toward the optimal or target value. This process may be repeated to find an optimum value for damper position 404 between the extremes. However, such functionality is not required and may not result in significantly improved system performance.

Referring now to FIG. 5, a table 500 containing energy performance results of several different types of control strategies is shown, according to an exemplary embodiment. The control strategy described with reference to FIGS. 1-4 is labeled "Simple ESC" in table 500. The energy performance of the simple ESC algorithm was evaluated using simulations that compared the annual coil load for three other economizer control strategies: fixed dry-bulb temperature control, differential enthalpy control and model-based control. Differential enthalpy control compares the enthalpies of the outdoor and return air streams and uses 100% outdoor air when the outdoor air enthalpy is less than that of the return air. Otherwise the differential enthalpy control strategy uses minimum outdoor air.

The model-based control strategy uses a model to determine which air stream will minimize the load on the coil at any given time. The model-based results represent the optimal two-position results (i.e., the dampers are positioned either for 100% outdoor air or minimum outdoor air) because the coil model used in the controller was also used to determine the coil exiting conditions in the simulation. Thus, there is no modeling error considered. In addition, there is no sensor error considered. The model-based control strategy always chooses the correct air stream to minimize the coil load.

For the simulation of the simple ESC algorithm, a time step of 5 seconds was used. For the other methods, the coil load was calculated on an hourly basis. Simulation tests revealed that the results for the other methods changed by less than 0.02% when the step size was reduced to 5 seconds.

Still referring to FIG. 5, table 500 shows results of the simulation tests for 15 U.S. cities, each in a different climate zone. The results in table 500 reveal that the simple ESC algorithm performs better than the fixed dry-bulb temperature control strategy in all cities except Phoenix and Cheyenne. For Charlotte, New York, Chicago, Minneapolis, and Rhinelander, the annual coil loads for simple ESC are 2.7% to 3.7% less than those for fixed dry-bulb temperature control. For Jackson and Seattle, the savings are 4.9% and 4.0%, respectively. In addition, for the cities in humid and marine climates, the simple ESC results are all within 0.8% of the theoretical optimum calculated by the model-based control strategy. For the cities in dry climates, the simple ESC results are all within 3.5% of the theoretical optimum.

Figure 6:
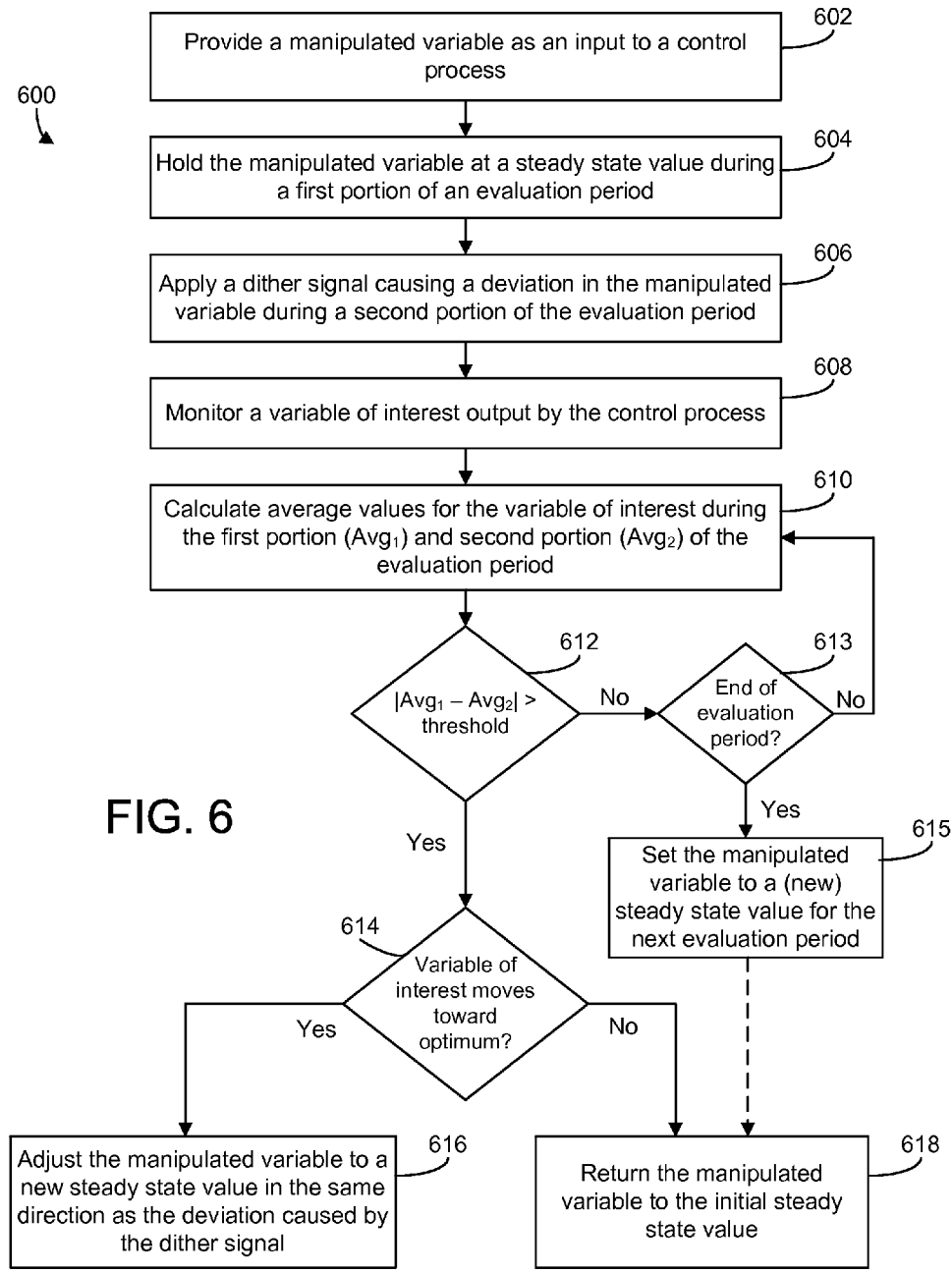
FIG. 6 is a flowchart of a process that may be performed by the controller of FIG. 3 for controlling an economizer in a building HVAC system, according to an exemplary embodiment.

Referring now to FIG. 6, a flowchart of a process 600 for controlling an economizer in a building HVAC system is shown, according to an exemplary embodiment. Process 600 may be performed by AHU controller 44 as described with reference to FIGS. 1-5. Process 600 is shown to include providing a manipulated variable as an input to a control process (step 602). The manipulated variable may be a normalized damper position (e.g., damp_pos), a control signal that can be applied to a damper (e.g., manipulated variable 103), or any other type of manipulated variable that can be provided to a control process.

Process 600 is shown to include holding the manipulated variable at a steady state value during a first portion of an evaluation period (step 604). In some embodiments, the steady state value is an extremum of possible values for the manipulated variable. In other embodiments, the steady state value is an intermediate value between two extremums for the manipulated variable. The first portion of the evaluation period may include a holding period (e.g., holding periods 405, 411, and 417) and/or a first averaging period (e.g., first averaging periods 408, 414, and 420). The value at which the manipulated variable is held may be a previously-determined optimal value for the manipulated variable, an extremum of the manipulated variable, and/or a value representing a current or previous state of the manipulated variable.

Still referring to FIG. 6, process 600 is shown to include applying a dither signal causing a deviation in the manipulated variable during a second portion of the evaluation period (step 606). Step 606 may include using a pulse parameter and a pulse_size parameter to generate the dither signal. The pulse parameter may define a maximum duration of the dither signal and the pulse_size parameter may define an amplitude of the dither signal. In some embodiments, the dither signal is a square wave applied to the current value of the manipulated variable. In other embodiments, the dither signal is a sinusoidal wave, a triangle wave, a sawtooth wave, or any other type of modification that can be applied to the manipulated variable. If the manipulated variable is at an extremum value, the dither signal may be half of the applied waveform. In some embodiments, the dither signal is a constant addition or subtraction from the steady state value of the manipulated variable. The pulse_size parameter may define a magnitude of the addition or subtraction. In other embodiments, the pulse_size parameter is a multiplier that is applied to a current value damper_pos.

Step 606 may include applying the dither signal to the manipulated variable at the beginning of a second portion of the evaluation period. Upon expiration of the second portion of the evaluation period, the dither signal may be removed from the manipulated variable. Step 606 may include applying the dither signal to the manipulated variable for a maximum duration defined by the pulse parameter. If the dither signal causes the value (or average value) of the variable of interest (e.g., process variable 105) to change by an amount exceeding a threshold (e.g., minimum or maximum bounds, a percent change, etc.), the dither signal may be removed prior to the expiration of the second portion of the evaluation period. However, if the dither signal does not cause the value of the variable of interest to change by an amount exceeding the threshold, the dither signal may be applied for the entire duration of the second portion of the evaluation period.

Still referring to FIG. 6, process 600 is shown to include monitoring a variable of interest output by the control process (step 608). The variable of interest may be, for example, a process variable (e.g., process variable 105) or a normalized value of the process variable (e.g., valve_pos). Step 608 may include observing the variable of interest directly or calculating the variable of interest from observed values. In various implementations, the variable of interest may be a valve position, an energy consumption, or any other variable that can be optimized by process 600.

Process 600 is shown to include calculating average values for the variable of interest during the first portion and the second portion of the evaluation period (step 610). In some embodiments, each value of the variable of interest is stored with a timestamp and step 610 calculates an average of the stored values. In other embodiments, step 610 includes performing an iterative averaging process at each time step in the first and second portions of the evaluation period.

At each time step in the first portion of the evaluation period, step 610 may include calculating a new value for $Avg_1$ using the following equation:

$$Avg_{1,k+1} = Avg_{1,k} + \frac{Y_k - Avg_{1,k}}{n\_samp1_k}$$

where $Avg_{1,k}$ is the current value of $Avg_1$ (i.e., at the current time step k), $n\_samp1_k$ is number of time steps k that have elapsed since the beginning of the first portion of the evaluation period, $Y_k$ is the current value of the variable of interest at time step k, and $Avg_{1,k+1}$ is the new value of $Avg_1$ at time step k+1. Upon expiration of the first portion of the evaluation period, the value of $Avg_1$ represents the average value of the variable of interest over the first portion of the evaluation period. The value of $Avg_1$ functions as a reference value for the variable of interest over a time period during which the dither signal is not applied.

At each time step in the second portion of the evaluation period, step 610 may include calculating a new value for $Avg_2$ using the following equation:

$$Avg_{2,k+1} = Avg_{2,k} + \frac{Y_k - Avg_{2,k}}{\max(1, n\_samp2_k - 1)}$$

where $Avg_{2,k}$ is the current value of $Avg_2$ (i.e., at the current time step k), $n\_samp2_k$ is number of time steps k that have elapsed since the beginning of the second portion of the evaluation period, $Y_k$ is the current value of the variable of interest, and $Avg_{2,k+1}$ is the new value of $Avg_2$ at time step k+1.

Still referring to FIG. 6, process 600 is shown to include determining whether the difference between the first average $Avg_1$ and the second average $Avg_2$ exceeds a threshold value (i.e., $|Avg_1 - Avg_2| >$ threshold) (step 612). The threshold value may be a function of the first average (e.g., $n*Avg_1$, $Avg_1 \pm n$, etc.), a fixed value, or an adaptive value. In some embodiments, the threshold value is between 0% and 10% of $Avg_1$ (e.g., 2.5% of $Avg_1$, 5% of $Avg_1$, etc.). If the difference does not exceed the threshold value, process 600 may determine whether the evaluation period has expired (step 613). If the evaluation period is still in progress (i.e., the result of step 613 is "no"), process 600 may return to step 610 and the second average $Avg_2$ may be recalculated using an updated value for the manipulated variable. Steps 610-613 may be repeated iteratively until either the difference between the first average $Avg_1$ and the second average $Avg_2$ exceeds the threshold (i.e., the result of step 612 is "yes") or the evaluation period ends (i.e., the result of step 613 is "yes").

If the evaluation period ends before the threshold criterion in step 612 is satisfied, process 600 may set the manipulated variable to a (new) steady state value for the next evaluation period (step 615). The steady state value set in step 615 may be a new steady state value (e.g., based on the value of $Avg_2$) or may be the same as the initial steady state value. For example, step 615 may include returning the manipulated variable to the initial steady state value (step 618). However, if the threshold criterion in step 612 is satisfied before the end of the evaluation period, process 600 may determine whether the variable of interest moves toward an optimum value (step 614). Step 614 may include identifying an optimum or target value for the variable of interest and determining whether the difference between $Avg_2$ and the optimum value is less than the difference between $Avg_1$ and the optimum value.

If the variable of interest does not move toward the optimum, process 600 may return the manipulated variable to the initial steady state value (step 618). However, if the variable of interest moves toward the optimum, process 600 may adjust the manipulated variable to a new steady state value (step 616). The new steady state may be one of a plurality of discrete values for the manipulated variable and/or an extremum for the manipulated variable. In some embodiments, step 616 includes switching the manipulated variable from one extremum to the other extremum. In other embodiments, step 616 includes adjusting the manipulated variable to the closest steady state value in the direction of the deviation caused by the dither signal.

Referring now to FIG. 7, a flowchart of another process 700 for controlling an economizer in a building HVAC system is shown, according to an exemplary embodiment. Process 700 may be performed by AHU controller 44 as described with reference to FIGS. 1-5. Process 700 is shown to include providing a manipulated variable as an input to a control process (step 702). The manipulated variable may be a normalized damper position (e.g., damp_pos), a control signal that can be applied to a damper (e.g., manipulated variable 103), or any other type of manipulated variable that can be provided to a control process.

Process 700 is shown to include holding the manipulated variable at a first extremum during a first portion of an evaluation period (step 704). The first portion of the evaluation period may include a holding period (e.g., holding periods 405, 411, and 417) and/or a first averaging period (e.g., first averaging periods 408, 414, and 420). The value at which the manipulated variable is held may be a previously-determined optimal value for the manipulated variable, an extremum of the manipulated variable, and/or a value representing a current or previous state of the manipulated variable. The first extremum may be a minimum or maximum of a range of values at which the manipulated variable can be provided to the control process.

Still referring to FIG. 7, process 700 is shown to include applying a dither signal to the manipulated variable during a second portion of the evaluation period (step 706) and monitoring a variable of interest output by the control process (step 708). The dither signal may cause the manipulated variable to deviate from the first extremum. The variable of interest may be, for example, a process variable (e.g., process variable 105) or a normalized value of the process variable (e.g., valve_pos). Step 708 may include observing the variable of interest directly or calculating the variable of interest from observed values. In various implementations, the variable of interest may be a valve position, an energy consumption, or any other variable that can be optimized by process 700.

Process 700 is shown to include switching the manipulated variable to a second extremum in response to the variable of interest moving toward an optimal value during the second portion of the evaluation period (step 710). The second extremum may be a minimum or maximum of a range of values at which the manipulated variable can be provided to the control process, opposite the first extremum. For example, if the first extremum is the maximum, the second extremum is the minimum.

Referring now to FIG. 8, a flowchart of another process 800 for controlling an economizer in a building HVAC system is shown, according to an exemplary embodiment. Process 800 may be performed by AHU controller 44 as described with reference to FIGS. 1-5. Process 800 is shown to include providing a manipulated variable as an input to a control process (step 802). The manipulated variable may be a normalized damper position (e.g., damp_pos), a control signal that can be applied to a damper (e.g., manipulated variable 103), or any other type of manipulated variable that can be provided to a control process.

Process 800 is shown to include holding the manipulated variable at an initial steady state value during a first portion of an evaluation period (step 804). In some embodiments, the initial steady state value is an extremum of possible values for the manipulated variable. In other embodiments, the initial steady state value is an intermediate value between two extremums for the manipulated variable. The first portion of the evaluation period may include a holding period (e.g., holding periods 405, 411, and 417) and/or a first averaging period (e.g., first averaging periods 408, 414, and 420). The value at which the manipulated variable is held may be a previously-determined optimal value for the manipulated variable, an extremum of the manipulated variable, and/or a value representing a current or previous state of the manipulated variable.

Still referring to FIG. 8, process 800 is shown to include applying a dither signal to the manipulated variable during a second portion of the evaluation period (step 806) and monitoring a variable of interest output by the control process (step 808). The dither signal may cause the manipulated variable to deviate from the initial steady state value in a first direction. The variable of interest may be, for example, a process variable (e.g., process variable 105) or a normalized value of the process variable (e.g., valve_pos). Step 808 may include observing the variable of interest directly or calculating the variable of interest from observed values. In various implementations, the variable of interest may be a valve position, an energy consumption, or any other variable that can be optimized by process 800.

Process 800 is shown to include determining a new steady state value for the manipulated variable based on whether the variable of interest moves toward an optimal value during the second portion of the evaluation period (step 810). If the variable of interest does not move toward the optimum, step 810 may return the manipulated variable to the initial steady state value. However, if the variable of interest moves toward the optimum, step 810 may adjust the manipulated variable to a new steady state value. The new steady state may be one of a plurality of discrete values for the manipulated variable and/or an extremum for the manipulated variable. In some embodiments, step 810 includes switching the manipulated variable from one extremum to the other extremum. In other embodiments, step 810 includes adjusting the manipulated variable to the closest steady state value in the direction of the deviation caused by the dither signal.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for controlling an economizer in a building HVAC system, the method comprising:
   providing, by a processing circuit, a manipulated variable as an input to a control process;
   holding, by the processing circuit, the manipulated variable at a first extremum during a first portion of an evaluation period;
   applying, by the processing circuit, a dither signal to the manipulated variable during a second portion of the evaluation period, the dither signal causing the manipulated variable to deviate from the extremum;
   monitoring, by the processing circuit, a variable of interest output by the control process during the first and second portions of the evaluation period;
   switching, by the processing circuit, the manipulated variable to a second extremum opposite the first extremum in response to the variable of interest moving toward an optimal value during the second portion of the evaluation period;

calculating a first value for the variable of interest using one or more values of the variable of interest observed during the first portion of the evaluation period;

calculating a second value for the variable of interest using one or more values of the variable of interest observed during the second portion of the evaluation period; and comparing the first and second calculated values to determine whether the variable of interest moves toward the optimal value;

removing the dither signal from the manipulated variable before an end of the second portion of the evaluation period in response to a determination that the variable of interest moves toward or away from the optimal value by an amount exceeding a threshold; and applying the dither signal to the manipulated variable for an entire duration of the second portion of the evaluation period in response to a determination that the variable of interest does not move toward or away from the optimal value by the amount exceeding the threshold.

2. The method of claim 1, wherein:
the first extremum is one of a maximum or a minimum of a range of values at which the manipulated variable can be provided to the control process; and
the second extremum is the other of the maximum or the minimum.

3. The method of claim 1, further comprising:
returning the manipulated variable to the first extremum in response to the variable of interest moving away from the optimal value during the second portion of the evaluation period.

4. The method of claim 1, wherein applying the dither signal to the manipulated variable comprises:
determining an amplitude of the dither signal; and
adjusting the manipulated variable toward the second extremum by an amount corresponding to the amplitude of the dither signal.

5. The method of claim 1, wherein comparing the first and second calculated values comprises:
using the first calculated value for the variable of interest to compute at least one of an upper threshold and a lower threshold; and
determining that the variable of interest moves toward the optimal value in response to a determination that the second calculated value for the variable of interest is greater than the upper threshold or less than the lower threshold.

6. The method of claim 1, wherein comparing the first and second calculated values comprises:
computing a difference between the first and second calculated values; and
determining that the variable of interest moves toward the optimal value in response to a determination that the difference between the first and second calculated values exceeds another threshold.

7. The method of claim 1, wherein:
the first calculated value is an average of a plurality of observed values of the variable of interest observed during the first portion of the evaluation period; and
the second calculated value is an average of a plurality of observed values of the variable of interest observed during the second portion of the evaluation period.

8. The method of claim 1, further comprising:
using the variable of interest to calculate a normalized value for the manipulated variable;

converting the normalized value for the manipulated variable into a control signal adapted for the control process; and providing the control signal as an input to the control process.

9. A method for controlling an economizer in a building HVAC system, the method comprising:
providing, by a processing circuit, a manipulated variable as an input to a control process;
holding, by the processing circuit, the manipulated variable at an initial steady state value during a first portion of an evaluation period;
applying, by the processing circuit, a dither signal to the manipulated variable during a second portion of the evaluation period, the dither signal causing the manipulated variable to deviate in a first direction from the initial steady state value;
monitoring, by the processing circuit, a variable of interest output by the control process during the first and second portions of the evaluation period;
adjusting, by the processing circuit, the manipulated variable in the first direction to a new steady state value in response to the variable of interest moving toward an optimal value during the second portion of the evaluation period;
calculating a first value for the variable of interest using one or more values of the variable of interest observed during the first portion of the evaluation period;
calculating a second value for the variable of interest using one or more values of the variable of interest observed during the second portion of the evaluation period; and
comparing the first and second calculated values to determine whether the variable of interest moves toward the optimal value;
removing the dither signal from the manipulated variable before an end of the second portion of the evaluation period in response to a determination that the variable of interest moves toward or away from the optimal value by an amount exceeding a threshold; and
applying the dither signal to the manipulated variable for an entire duration of the second portion of the evaluation period in response to a determination that the variable of interest does not move toward or away from the optimal value by the amount exceeding the threshold.

10. The method of claim 9, further comprising identifying a plurality of discrete values at which the manipulated variable can be provided to the control process;
wherein holding the manipulated variable at the initial steady state value comprises holding the manipulated variable at one of a plurality of identified discrete values.

11. The method of claim 9, wherein the initial steady state value is a first extremum of the manipulated variable and the new steady state value is a second extremum of the manipulated variable, opposite the first extremum.

12. The method of claim 9, wherein at least one of the initial steady state value and the new steady state value is an intermediate value between two extremums of the manipulated variable.

13. The method of claim 9, further comprising:
returning the manipulated variable to the initial steady state value in response to the variable of interest not moving toward the optimal value during the second portion of the evaluation period.

14. The method of claim 9, further comprising:
adjusting the manipulated variable in a second direction opposite the first direction in response to the variable of interest moving away from the optimal value during the second portion of the evaluation period.

15. An economizer controller in a building HVAC system, the controller comprising:
a communications interface configured to provide a manipulated variable as an input to a control process; and
a processing circuit comprising a processor and memory, wherein the processing circuit is configured to:
hold the manipulated variable at an initial steady state value during a first portion of an evaluation period;
apply a dither signal to the manipulated variable during a second portion of the evaluation period, the dither signal causing the manipulated variable to deviate in a first direction from the initial steady state value;
monitor a variable of interest output by the control process during the first and second portions of the evaluation period;
adjust the manipulated variable in the first direction to a new steady state value in response to the variable of interest moving toward an optimal value during the second portion of the evaluation period;
calculate a first value for the variable of interest using one or more values of the variable of interest observed during the first portion of the evaluation period;
calculate a second value for the variable of interest using one or more values of the variable of interest observed during the second portion of the evaluation period; and
compare the first and second calculated values to determine whether the variable of interest moves toward the optimal value;
remove the dither signal from the manipulated variable before an end of the second portion of the evaluation period in response to a determination that the variable of interest moves toward or away from the optimal value by an amount exceeding a threshold; and
apply the dither signal to the manipulated variable for an entire duration of the second portion of the evaluation period in response to a determination that the variable of interest does not move toward or away from the optimal value by the amount exceeding the threshold.

16. The controller of claim 15, wherein the initial steady state value is a first extremum of the manipulated variable and the new steady state value is a second extremum of the manipulated variable, opposite the first extremum.

17. The controller of claim 15, wherein the processing circuit is configured to return the manipulated variable to the initial steady state value in response to the variable of interest not moving toward the optimal value during the second portion of the evaluation period.

* * * * *